United States Patent
Wu et al.

(10) Patent No.: US 11,874,520 B2
(45) Date of Patent: Jan. 16, 2024

(54) OPTICAL ELEMENT DRIVING MODULE

(71) Applicant: TDK TAIWAN CORP., Taoyuan (TW)

(72) Inventors: Fu-Yuan Wu, Taoyuan (TW);
Kun-Shih Lin, Taoyuan (TW);
Yu-Huai Liao, Taoyuan (TW);
Yu-Cheng Lin, Taoyuan (TW);
Yen-Cheng Chen, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 115 days.

(21) Appl. No.: 17/699,670

(22) Filed: Mar. 21, 2022

(65) Prior Publication Data
US 2022/0214516 A1   Jul. 7, 2022

Related U.S. Application Data

(63) Continuation of application No. 16/448,816, filed on Jun. 21, 2019, now Pat. No. 11,314,032.

(60) Provisional application No. 62/711,036, filed on Jul. 27, 2018, provisional application No. 62/688,694, filed on Jun. 22, 2018.

(51) Int. Cl.
| | |
|---|---|
| *G02B 7/02* | (2021.01) |
| *H02K 41/035* | (2006.01) |
| *G02B 7/09* | (2021.01) |
| *H01F 7/02* | (2006.01) |
| *H01F 7/06* | (2006.01) |

(52) U.S. Cl.
CPC ............... *G02B 7/02* (2013.01); *G02B 7/09* (2013.01); *H02K 41/0354* (2013.01); *H01F 7/02* (2013.01); *H01F 7/06* (2013.01)

(58) Field of Classification Search
USPC ....... 359/911, 554, 555, 557, 811, 813, 814, 359/823, 824, 872, 877
See application file for complete search history.

(56) References Cited

U.S. PATENT DOCUMENTS

| 2016/0025995 A1 | 1/2016 | Ariji |
| 2017/0153413 A1 | 6/2017 | Lin et al. |

FOREIGN PATENT DOCUMENTS

| JP | 2008203284 A | 9/2008 |
| TW | 201435424 A | 9/2014 |

*Primary Examiner* — Stephone B Allen
*Assistant Examiner* — Tamara Y. Washington
(74) *Attorney, Agent, or Firm* — Muncy, Geissler, Olds & Lowe, P.C.

(57) ABSTRACT

An optical element driving mechanism is provided, including a base, a holder movably coupled to the base for holding an optical element, a casing, a frame, a driving assembly, and an adhering member. The casing has a top wall and a plurality of side walls extending from the edge of the top wall along an optical axis of the optical element, and the top wall is closer to a light-incident end than the base. The frame is disposed on the top wall and has a frame protrusion extending toward the base. The driving assembly is configured to drive the holder to move relative to the base, and an accommodating space is formed between the base, the frame and the casing. The adhering member is disposed in the accommodating space and configured to directly adhere to the base, the frame, the casing, and the driving assembly.

20 Claims, 30 Drawing Sheets

OPTICAL ELEMENT DRIVING MODULE

CROSS REFERENCE TO RELATED APPLICATIONS

This application is a Continuation of application Ser. No. 16/448,816, filed on Jun. 21, 2019, which claims the benefit of provisional Application Ser. No. 62/688,694, filed on Jun. 22, 2018, U.S. Provisional Patent Application Ser. No. 62/711,036, filed on Jul. 27, 2018, the entirety of which are incorporated by reference herein.

BACKGROUND OF THE INVENTION

Field of the Invention

The application relates in general to a driving module, and in particular, to a driving module which is used to hold and move an optical element.

Description of the Related Art

As technology has advanced, a lot of electronic devices (for example, tablet computers and smartphones) have incorporated the functionality of taking photographs and recording video. These electronic devices have become more commonplace, and have been developed to be more convenient and thin. More and more options are provided for users to choose from.

Since the space inside the camera module is limited, the components are usually adhered to each other by glue to prevent deformation and damages during assembly of the camera module, so that the reliability of the products can be increased. However, a large number of glue application stations are often required because a large number of components need to be assembled, thus leading to increase of assembly time and production cost.

Additionally, because the components inside a camera module have small dimensions, it is difficult to rapidly and precisely apply glue in the correct positions between the components by manual labor. Therefore, conventional camera modules usually have problems with low production yield and high production costs.

BRIEF SUMMARY OF INVENTION

In view of the aforementioned problems, the object of the invention is to provide an optical element driving module that includes a fixed portion, a movable portion, a driving assembly, and at least a glue. The fixed portion includes a housing and a base. The movable portion is movable relative to the fixed portion, and the driving assembly includes at least a coil and at least a magnetic element for driving the movable portion to move relative to the fixed portion. Specifically, the housing, the base, and the magnetic element are adhered to each other by the glue.

Another object of the invention is to provide an optical element driving mechanism that includes a base, a holder, a casing, a frame, a driving assembly, and an adhering member. The holder is movably connected to the base, the holder is configured to hold an optical element, and the optical element defines an optical axis. The casing has a top wall and a plurality of side walls extending from the edge of the top wall along the optical axis, and the top wall is closer to a light-incident end than the base. The frame is disposed on the top wall and has a frame protrusion extending toward the base. The driving assembly is configured to drive the holder to move relative to the base, and an accommodating space is formed between the base, the frame and the casing. The adhering member is disposed in the accommodating space and configured to directly adhere to the base, the frame, the casing, and the driving assembly.

BRIEF DESCRIPTION OF DRAWINGS

The invention can be more fully understood by reading the subsequent detailed description and examples with references made to the accompanying drawings, wherein:

FIG. 1-2 is a perspective diagram of the optical element driving module 1-1 in FIG. 1 after assembly.

FIG. 1-3 is a perspective diagram of the optical element driving module 1-1 with the housing 1-10 and the glues 1-70 omitted therefrom.

FIG. 1-4 is a top view of the optical element driving module 1-1 of FIG. 1-2 with the base 1-20, the second resilient member 1-40 and the glues 1-70 omitted therefrom.

FIG. 1-5 is a perspective diagram of the mechanism of FIG. 1-3 with the glues 1-70 applied thereto.

FIG. 1-6 is a top view of the mechanism of FIG. 1-4 with the glues 1-70 applied thereto.

FIG. 1-7 is a cross-sectional view taken along line X1-X1 in FIG. 1-2.

FIG. 1-8 is a perspective diagram showing an optical element driving module 1-1 according to another embodiment of the invention.

FIG. 1-9 is a perspective diagram of the optical element driving module 1-1 of FIG. 1-8 with the housing 1-10 and one of the glues 1-70 omitted therefrom.

FIG. 1-10 is a cross-sectional view taken along line X2-X2 in FIG. 1-8.

FIG. 1-11 is a perspective diagram showing an optical element driving module 1-1 according to another embodiment of the invention.

FIG. 1-12 is a perspective diagram of the optical element driving module 1-1 of FIG. 1-11 with the housing 1-10 omitted therefrom.

FIG. 1-13 is a side view of an optical element driving module 1-1 with the housing 1-10 omitted therefrom, according to another embodiment of the invention.

FIG. 1-14, shows a holder 1-50 and two oval coils 1-52 disposed on the holder 1-50 according to another embodiment of an optical element driving module 1-1.

FIG. 2-1 shows a schematic diagram of an optical element driving mechanism 2-100 according to an embodiment of the present disclosure.

FIG. 2-2 shows an exploded diagram of the optical element driving mechanism 2-100 according to the embodiment of the present disclosure.

FIG. 2-3 shows a cross-sectional view along line A-A' in FIG. 2-1 according to the embodiment of the present disclosure.

FIG. 2-4 is a schematic diagram showing a partial structure of the optical element driving mechanism 2-100 according to an embodiment of the present disclosure.

FIG. 2-5 is a cross-sectional view along line B-B' in FIG. 2-1 according to an embodiment of the present disclosure.

FIG. 2-6 is a partial structural diagram of the frame 2-104 and the first magnet 2-M11 according to an embodiment of the present disclosure.

FIG. 2-7 is a partial structural diagram of the base 2-112 according to some embodiments of the present disclosure.

FIG. 2-8 is a cross-sectional view of the optical element driving mechanism 2-100 according to another embodiment of the present disclosure.

FIG. 2-9 is a partial structural diagram of the frame 2-104, the base 2-112, and the second elastic member 2-110 according to an embodiment of the present disclosure.

FIG. 2-10 is a partial structural diagram of an optical element driving mechanism 2-100' according to another embodiment of the present disclosure.

FIG. 2-11 is a cross-sectional view along line C-C' in FIG. 2-1 according to an embodiment of the present disclosure.

FIG. 2-12 is a schematic diagram of a frame 2-104A and a first elastic member 2-106 of an optical element driving mechanism 2-100A according to another embodiment of the present disclosure.

FIG. 2-13 is a schematic diagram of the frame 2-104A, a first elastic member 2-2-106 and the holder 2-108 according to another embodiment of the present disclosure.

FIG. 2-14 is a cross-sectional view of the optical element driving mechanism 2-100A according to another embodiment of the present disclosure.

FIG. 2-15 is a partial cross-sectional view of an optical element driving mechanism 2-100B according to another embodiment of the present disclosure.

FIG. 2-16 is a cross-sectional view of the optical element driving mechanism 2-100 along line D-D' in FIG. 2-1 according to an embodiment of the present disclosure.

DETAILED DESCRIPTION OF INVENTION

The making and using of the embodiments of the optical element driving module are discussed in detail below. It should be appreciated, however, that the embodiments provide many applicable inventive concepts that can be embodied in a wide variety of specific contexts. The specific embodiments discussed are merely illustrative of specific ways to make and use the embodiments, and do not limit the scope of the disclosure.

Unless defined otherwise, all technical and scientific terms used herein have the same meaning as commonly understood by one of ordinary skill in the art to which this invention belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

In the following detailed description of the preferred embodiments, reference is made to the accompanying drawings, and in which specific embodiments of which the invention may be practiced are shown by way of illustration. In this regard, directional terminology, such as "top," "bottom," "left," "right," "front," "back," etc., is used with reference to the orientation of the figures being described. The components of the present invention can be positioned in a number of different orientations. As such, the directional terminology is used for the purposes of illustration and is in no way limiting.

Embodiments of Group I

Figure 1:
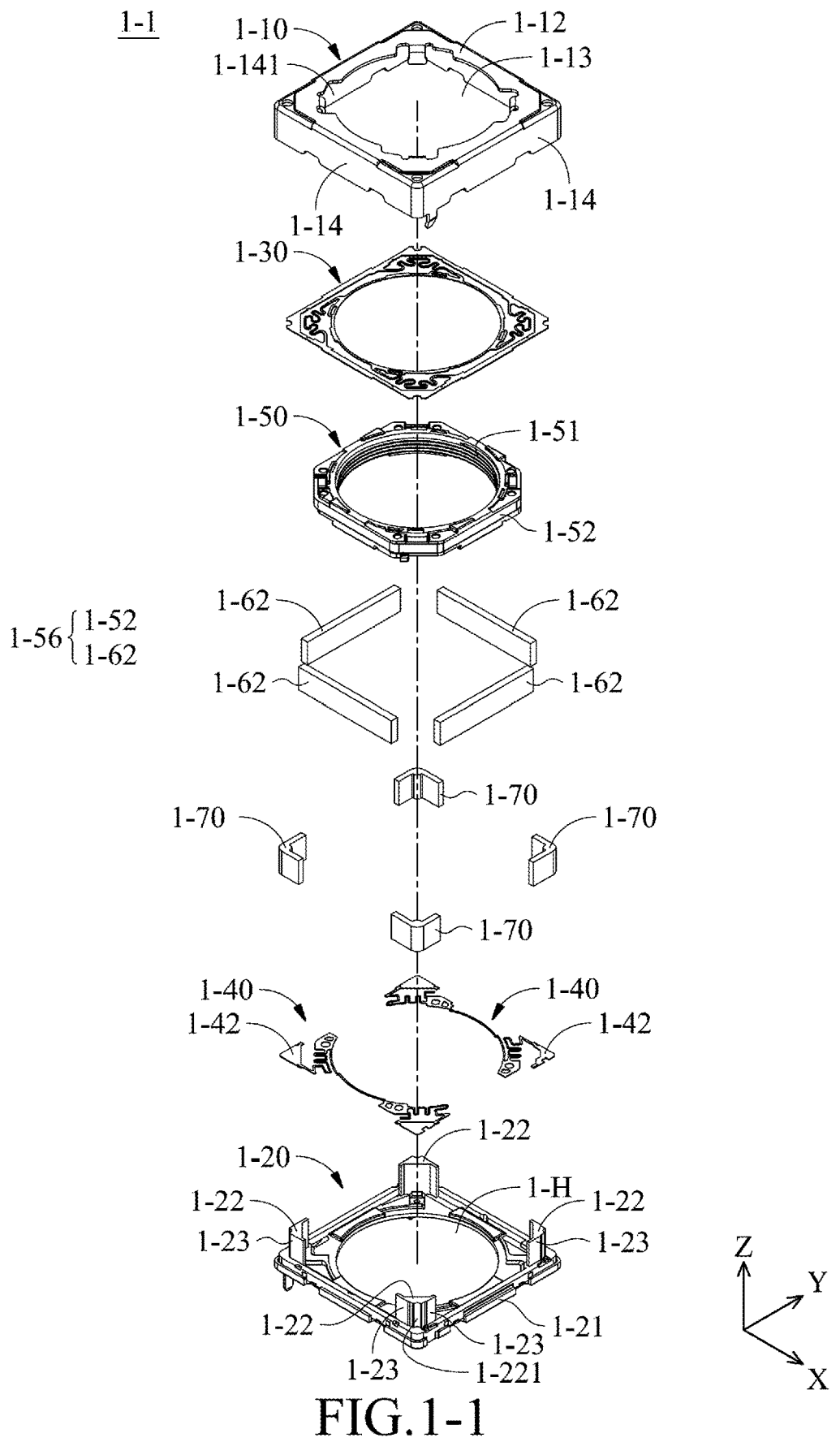
FIG. 1-1 is an exploded diagram showing an optical element driving module 1-1 according to an embodiment of the invention.
Figures 1, 2:
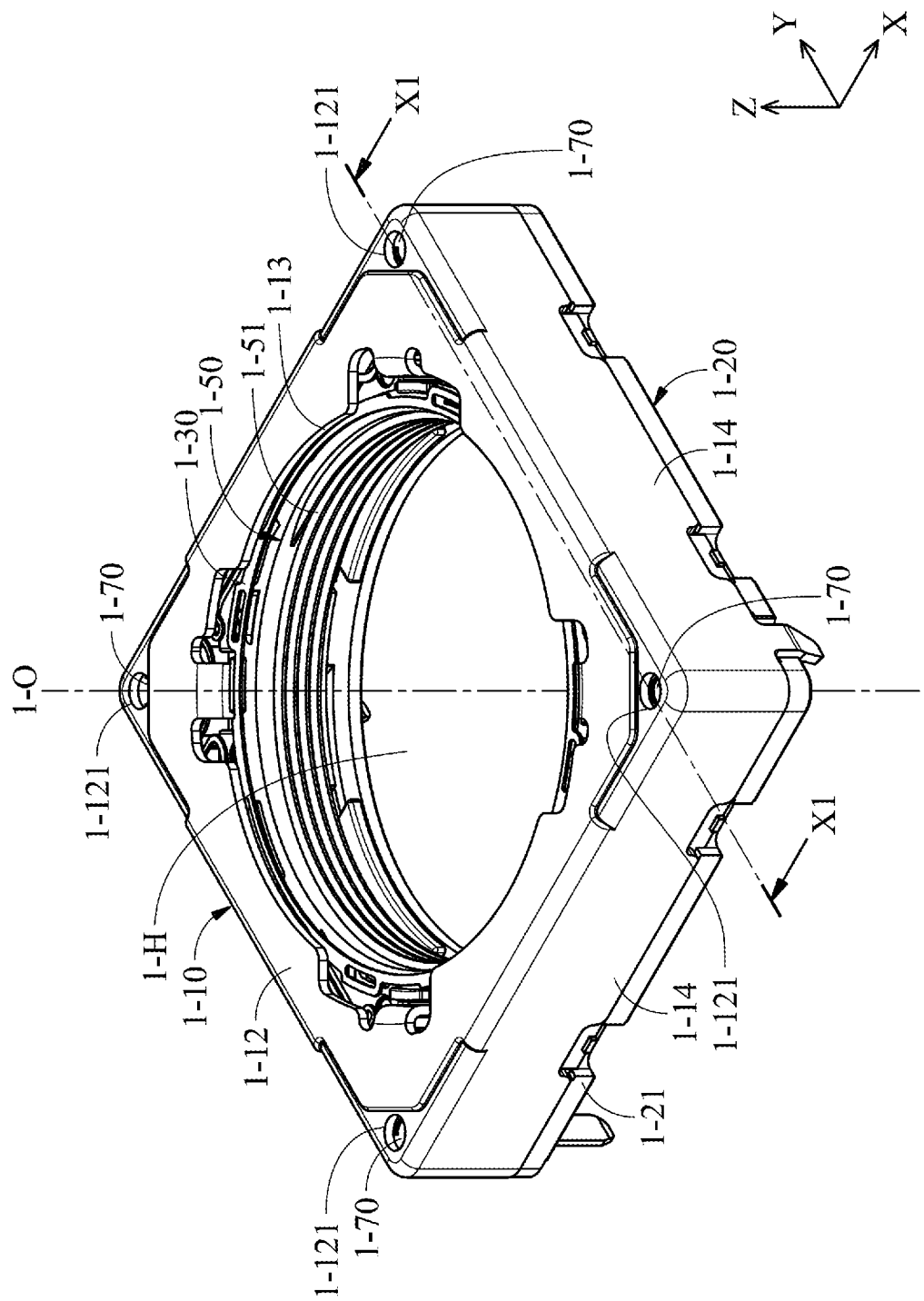

FIG. 1-1 is an exploded diagram showing an optical element driving module 1-1 according to an embodiment of the invention, and FIG. 1-2 is a perspective diagram of the optical element driving module 1-1 in FIG. 1-1 after assembly. Here, the optical element driving module 1-1 has a rectangular structure and primarily comprises a housing 1-10, a base 1-20, a first resilient member 1-30, a second resilient member 1-40, a holder 1-50, a coil 1-52, at least a magnetic element 1-62 (e.g. magnet), and a glue 1-70. The holder 1-50 has an opening 1-51, and an optical element (not shown) can be disposed in the opening 1-51.

In this embodiment, the holder 1-50 constitute a movable portion of the optical element driving module 1-1 for holding the optical element (e.g. optical lens). The housing 1-10 and the base 1-20 constitute a fixed portion of the optical element driving module 1-1, wherein the first and second resilient members 1-30 and 1-40 movably connect the movable portion to the fixed portion. Additionally, at least one of the magnets 1-60 and the coil 1-52 on the holder 1-50 constitute a driving assembly 1-56. When an electrical current is applied to the coil 1-52, the magnet 1-60 and the coil 1-52 can produce an electromagnetic force driving the movable portion to move relative to the fixed portion.

As shown in FIGS. 1-1 and 1-2, the housing 1-10 has a top cover 1-12, an opening 1-13, and at least a sidewall 1-14. In this embodiment, the top cover 1-12 forms four through holes 1-121 (FIG. 1-2) located at the four corners thereof, wherein the through holes 1-121 are extended through the top cover 1-12 along the optical axis 1-O of the optical element (Z direction). Moreover, the opening 1-13 is extended through the top cover 1-12 along the optical axis 1-O of the optical element (Z direction), and the diameter of the opening 1-13 is greater than the diameter of the through holes 1-121. The sidewalls 1-14 are extended from the edges of the top cover 1-12 toward the base 1-20 along the optical axis 1-O (Z direction), and the sidewalls 1-14 and the base 1-20 are connected to each other. Specifically, the housing 1-10 further has an inner surface 1-141 (FIG. 1-1) surrounding the holder 1-50 and parallel to the optical axis 1-O (Z direction).

The base 1-20 comprises a main body 1-21, a plurality of protrusions 1-22 and an opening 1-H, wherein the opening 1-H is extended through the main body 1-21 along the optical axis 1-O (Z direction). The protrusions 1-22 are respectively disposed at the four corners of the main body 1-21 and extend toward the top cover 1-12 of the housing 1-10. As shown in FIG. 1-1, each of the protrusions 1-22 forms two lateral surfaces 1-23 perpendicular to each other. The lateral surfaces 1-23 face the inner surface 1-141 of the housing 1-10, and each protrusion 1-22 forms a longitudinal recess 1-221 between two adjacent lateral surfaces 1-23, wherein the recess 1-221 extends along the optical axis 1-O (Z direction). Here, the recesses 1-221 are located correspond to the through holes 1-121 of the housing 1-10, so that several glues 1-70 can be applied into the spaces between the lateral surfaces 1-23 of the protrusions 1-22 and the inner surface 1-141 of the housing 1-10 via the through holes 1-121, and the housing 1-10 and the base 1-20 can therefore be firmly connected to each other.

Figures 1, 2, 3:
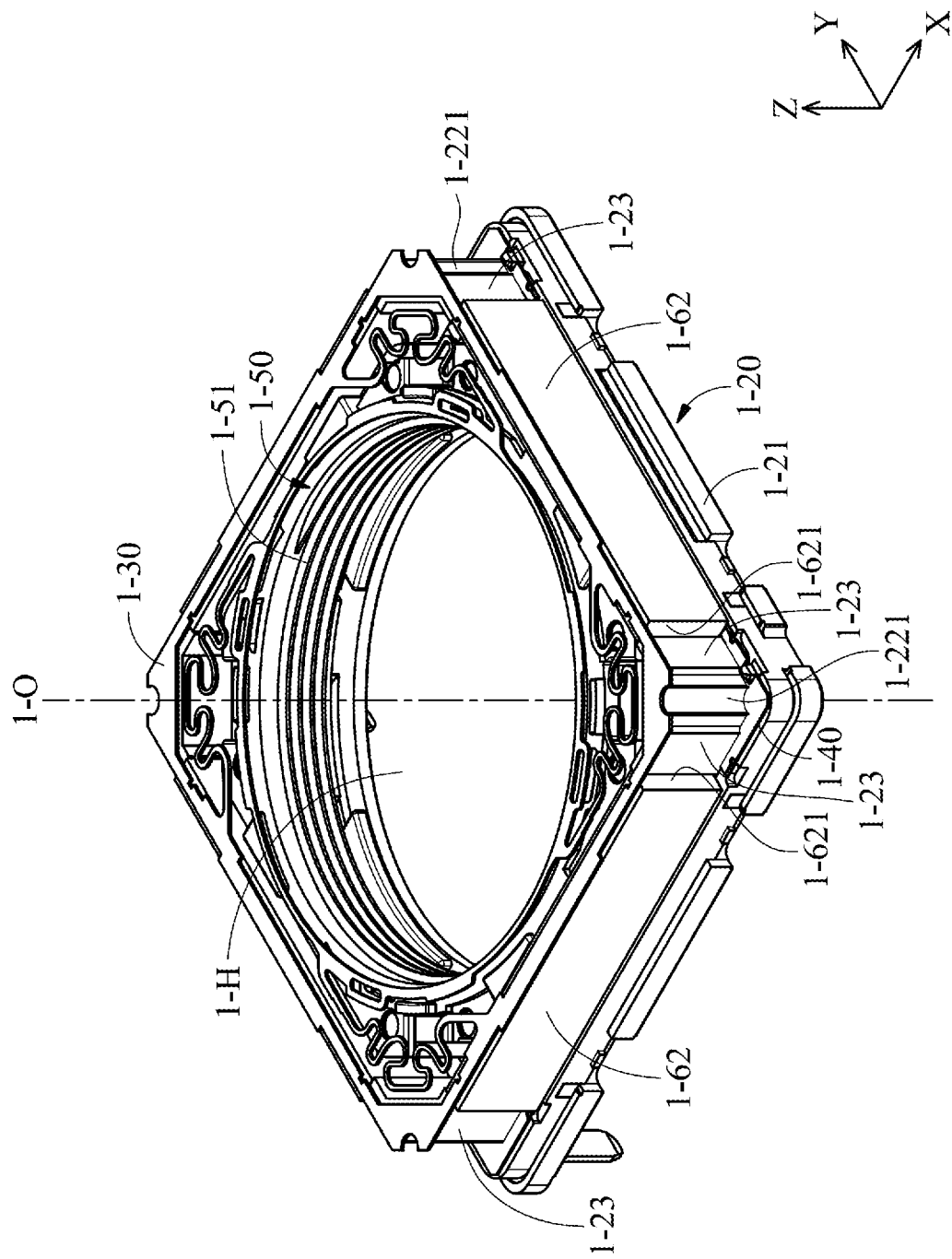

FIG. 1-3 is a perspective diagram of the optical element driving module 1-1 with the housing 1-10 and the glues 1-70 omitted therefrom, and FIG. 1-4 is a top view of the optical element driving module 1-1 of FIG. 1-2 with the base 1-20, the second resilient member 1-40 and the glues 1-70 omitted therefrom. Referring to FIGS. 1-1 to 1-4, the optical axis 1-O of the optical element passes through the opening 1-13 of the housing 1-10, the opening 1-51 of the holder 1-50, and an opening 1-H of the base 1-20. In this embodiment, the optical element (such as a lens) can receive and guide light to sequentially propagate through the opening 1-13 of the housing 1-10, the opening 1-51 of the holder 1-50, and the opening 1-H of the base 1-20 to an image sensor (not shown).

FIG. 1-5 is a perspective diagram of the mechanism of FIG. 1-3 with the glues 1-70 applied thereto, FIG. 1-6 is a top view of the mechanism of FIG. 1-4 with the glues 1-70 applied thereto, and FIG. 1-7 is a cross-sectional view taken along line XI-XI in FIG. 1-2. As shown in FIG. 1-7, the first resilient member 1-30 is located between the top cover 1-12 of the housing 1-10 and the holder 1-50, and it connects the top surfaces of the protrusions 1-22 and the holder 1-50. The first resilient member 1-30 in FIG. 1-7 has a first surface 1-32 (lower surface) perpendicular to the Z axis, not parallel to the inner surface 1-141 of the housing 1-10.

Referring to FIGS. 1-1 and 1-7, the second resilient members 1-40 are located between the holder 1-50 and the main body 1-21 of the base 1-20, and they connect the bottom surface of the holder 1-50 and the top surface of the main body 1-21. In this embodiment, the second resilient members 1-40 are electrically connected to the metal circuits embedded in the base 1-20. It should be noted that the second resilient member 1-40 in FIG. 1-7 has a second surface 1-42 on the top side thereof, perpendicular to the optical axis 1-O (Z direction) and facing the first surface 1-32 of the first resilient member 1-30.

As mentioned above, the driving assembly 1-56 comprises at least a magnetic element 1-62 and a coil 1-52. In this embodiment, the driving assembly 1-56 comprises four magnetic elements 1-62 and one coil 1-52. The magnetic elements 1-62 are disposed on the four sides of the base 1-20 and located above the top surface of the main body 1-21, wherein each magnetic element 1-62 is positioned between two adjacent protrusions 1-22. Moreover, each magnetic element 1-62 has a connection surface 1-621 (FIG. 1-4) in contact with the glue 1-70, wherein the connection surface 1-621 is perpendicular to the inner surface 1-141 of the housing 1-10.

The coil 1-52 is disposed around the holder 1-50 and located corresponding to the magnetic elements 1-62. In this embodiment, the coil 1-52 is electrically connected to the second resilient member 1-40, whereby the metal circuit inside the base 1-20 can receive and transfer an external electrical current to the coil 1-52 via the second resilient member 1-40. Therefore, the coil 1-52 and the magnetic elements 1-62 can produce an electromagnetic force driving the holder 1-50 to move relative to the fixed portion along the optical axis 1-O (Z direction), so as to achieve auto-focusing of the optical element driving module 1-1 and improve the quality of the images captured by the image sensor.

Referring to FIGS. 1-5 to 1-7, four L-shaped spaces are formed between the first resilient member 1-30, the inner surface 1-141 of the housing 1-10, and the four protrusions 1-22 of the base 1-20 for accommodating the glues 1-70. Specifically, the L-shaped spaces are communicated with through holes 1-121 of the housing 1-10, and each of the glues 1-70 forms an L-shaped structure after solidification, as shown in FIG. 1-1.

During assembly of the optical element driving module 1-1, the glues 1-70 can be applied into the spaces via the through holes 1-121 of the housing 1-10. The protrusions 1-22 of the base 1-20 can guide the glues 1-70 to efficiently flow into the spaces, so that the glues 1-70 are in contact with the inner surface 1-141 of the housing 1-10, the lateral surfaces 1-23 of the protrusions 1-22, the first surface 1-32 of the first resilient member 1-30, the second surface 1-42 of the second resilient member 1-40, and the connection surfaces 1-621 of the magnetic elements 1-62. In some embodiments, however, the optical element driving module 1-1 may comprise only one resilient member (either the first resilient member 1-30 or the second resilient member 1-40).

In this embodiment, with the through holes 1-121 formed on the housing 1-10 and communicated with the spaces inside the optical element driving module 1-1, the glues 1-70 can be directly injected into the spaces via the through holes 1-121, thereby adhering the housing 1-10, the base 1-20, the first and second resilient members 1-30 and 1-40, and the magnetic elements 1-62 to each other. Therefore, the components inside the optical element driving module 1-1 can be rapidly positioned, so as to improve the efficiency of manual assembly. Moreover, the number of glue application stations can also be reduced to save production cost and enhance manufacturing efficiency of the optical element driving module 1-1.

FIG. 1-8 is a perspective diagram showing an optical element driving module 1-1 according to another embodiment of the invention, FIG. 1-9 is a perspective diagram of the optical element driving module 1-1 of FIG. 1-8 with the housing 1-10 and one of the glues 1-70 omitted therefrom, and FIG. 1-10 is a cross-sectional view taken along line X2-X2 in FIG. 1-8. Different from FIGS. 1-1 to 1-7, the base 1-20 in the embodiment of FIGS. 1-8 to 1-10 forms four through holes 1-24 at the corners of the main body 1-21, wherein the through holes 1-24 are aligned to the recesses 1-221 of the protrusions 1-22 and communicated with the spaces inside the optical element driving module 1-1 for applying the glues 1-70.

It should be noted that several metal circuits 1-26 are embedded in the base 1-20, wherein the ends of the metal circuits 1-26 are exposed to the top surfaces of the protrusions 1-22 to electrically contact the first resilient member 1-30 (FIG. 1-9). Thus, the metal circuits 1-26 can be electrically connected to the coil 1-52 via the first resilient member 1-30. Owing to the through holes 1-24 formed on the base 1-20 and the first resilient member 1-30 electrically connecting the metal circuits 1-26 to the coil 1-52, the through holes 1-121 on the housing 1-10 and the second resilient member and 1-40 may be omitted from the optical element driving module 1-1, whereby the production cost and the number of assembly stations can be reduced, and miniaturization of the optical element driving module 1-1 can also be achieved.

During assembly of the optical element driving module 1-1, an assembly operator may apply the glues 1-70 to the spaces inside the base 1-20 via the through holes 1-24. Hence, the housing 1-10, the base 1-20, the first resilient member 1-30, and the magnetic element 1-62 can be adhered to each other at the same time, so as to enhance the efficiency of manual assembly.

FIG. 1-11 is a perspective diagram showing an optical element driving module 1 according to another embodiment of the invention, FIG. 1-12 is a perspective diagram of the optical element driving module 1-1 of FIG. 1-11 with the housing 1-10 omitted therefrom. Different from FIGS. 1-1 to 1-7, the optical element driving module 1-1 in FIGS. 1-11 to 1-12 comprises only two magnetic elements 1-62 respectively on two opposite sides of the base 1-20 (only one magnetic element 1-62 is shown in FIG. 1-12). Additionally, the optical element driving module 1 further comprises a circuit board 1-80 located between the two magnetic elements 1-62, wherein the circuit board 1-80 and the two magnetic elements 1-62 are situated on different sides of the base 1-20. Here, the circuit board 1-80 is electrically connected to the second resilient member 1-40 below the holder 1-50.

In the optical element driving module 1-1 of FIGS. 1-11 to 1-12, the glues 1-70 can be applied directly to the spaces inside the housing 1-10 via the through holes 1-121. Hence, the housing 1-10, the base 1-20, the first resilient member 1-30, the second resilient member 1-40, and the magnetic element 1-62 can be adhered to each other at the same time, so as to enhance the efficiency of manual assembly.

FIG. 1-13 is a side view of an optical element driving module 1-1 with the housing 1-10 omitted therefrom, according to another embodiment of the invention. In this embodiment, the spaces for receiving the glues 1-70 are extended to the circuit board 1-80 along the X axis. Hence, the glues 1-70 can directly contact the circuit board 1-80 when applied into the spaces, so that the circuit board 1-80 can be firmly affixed to the base 1-20 to enhance the assembly efficiency.

In some embodiments, a position-sensing element such as Hall effect sensor (not shown) may be disposed on and electrically connected to the circuit board 1-80 to detect the movement of the movable portion relative to the fixed portion. Thus, accurate positioning and rapid response time of the optical element driving module 1-1 can be both achieved.

Referring to FIG. 1-14, another embodiment of the optical element driving module 1-1 comprises two oval coils 1-52 arranged on two opposite sides of the holder 1-50, wherein the coils 1-52 are located corresponding to two of the magnetic elements 1-62 (FIG. 1-1). When an electrical current is applied to the coils 1-52, the magnetic elements 1-62 and the coils 1-52 can produce an electromagnetic force driving the holder 1-50 to move relative to the fixed portion along the optical axis (Z direction), thereby achieving auto-focusing of the optical element driving module 1-1 and improving the quality of the images captured by the image sensor.

In summary, since the glues 1-70 can be applied into the spaces inside the optical element driving module 1-1, the housing 1-10, the base 1-20, the first resilient member 1-30, the second resilient member 1-40, and the magnetic element 1-62 can be adhered to each other at the same time. Thus, the number of glue application stations can be reduced to save production cost and enhance manufacturing efficiency of the optical element driving module 1-1.

Moreover, by forming the through holes 1-121 on the housing 1-10 or forming the through holes 1-24 on the base 1-20, an assembly operator can precisely apply the glues 1-70 to the spaces inside the optical element driving module 1-1, and the glues 1-70 can be rapidly guided to predetermined positions between different components inside the optical element driving module 1-1, whereby misassembly of the optical element driving module 1-1 can be prevented, and the efficiency of manual assembly can be greatly enhanced.

Embodiments of Group II

Please refer to FIG. 2-1 to FIG. 2-3. FIG. 2-1 shows a schematic diagram of an optical element driving mechanism 2-100 according to an embodiment of the present disclosure, FIG. 2-2 shows an exploded diagram of the optical element driving mechanism 2-100 according to the embodiment of the present disclosure, and FIG. 2-3 shows a cross-sectional view along line A-A' in FIG. 2-1 according to the embodiment of the present disclosure. The optical element driving mechanism 2-100 can be an optical camera system and can be configured to hold and drive an optical element (not shown in the figures). The optical element driving mechanism 2-100 can be installed in various electronic devices or portable electronic devices, such as a smartphone or a tablet computer, for allowing a user to perform the image capturing function. In this embodiment, the optical element driving mechanism 2-100 can be a voice coil motor (VCM) with an auto-focusing (AF) function, but it is not limited thereto. In other embodiments, the optical element driving mechanism 2-100 can also perform the functions of auto-focusing and optical image stabilization (OIS).

As shown in FIG. 2-1 to FIG. 2-3, in the present embodiment, the optical element driving mechanism 2-100 mainly includes a fixed assembly (may include a casing 2-102, a frame 2-104 and a base 2-112), a first elastic member 2-106, a movable assembly (may include a holder 2-108), a driving assembly (may include a first magnet 2-M11, a second magnet 2-M12, and a driving coil 2-DCL), a second elastic member 2-110, and a circuit assembly 2-114.

The holder 2-108 can move relative to the fixed assembly, and the holder 2-108 is configured to hold the optical element (now shown in the figures), such as a lens, an optical axis 2-O is defined by the optical element. It should be noted that in other embodiments, the members in the fixed assembly can also be adjusted to be movable (that is, they can be included in the movable assembly) according to practical requirements.

As shown in FIG. 2-2, the casing 2-102 has a hollow structure, and a casing opening 2-1021 is formed on the casing 2-102. A base opening 2-1121 is formed on the base 2-112. The center of the casing opening 2-1021 corresponds to the optical axis 2-O of the optical element. The base opening 2-1121 corresponds to an image sensing element (now shown in the figures) disposed below the base 2-112. External light can enter the casing 2-102 through the casing opening 2-1021, and then to be received by the image sensing element (not shown) after passing through the optical element and the base opening 2-1121, so as to generate a digital image signal.

In addition, the casing 2-102 may include an accommodating space 2-1023 for accommodating the frame 2-104, the holder 2-108, the first elastic member 2-106, the first magnet 2-M11, the second magnet 2-M12, the driving coil 2-DCL, the circuit assembly 2-114, and so on. In this embodiment, the circuit assembly 2-114 may be a circuit board which is disposed on the frame 2-104, and the driving assembly is electrically connected to the circuit assembly 2-114 and can drive the holder 2-108 to move relative to the fixed assembly (for example, to move relative to the base 2-112 or the frame 2-104).

In this embodiment, the shape of the first magnet 2-M11 and of the second magnet 2-M12 may be a long strip-shaped structure, but the number of magnets and their shape are not limited to the above. For example, they may be shaped differently in other embodiments. In addition, the first magnet 2-M11 or the second magnet 2-M12 can be a multi-pole magnet.

As shown in FIG. 2-2 and FIG. 2-3, the casing 2-102 has a top wall 2-102T and a plurality of side walls 2-102S extending from the edge of the top wall 2-102T along the optical axis 2-O, and the top wall 2-102T is closer to a light-incident end (above the top wall 2-102T in FIG. 2-3) than the base 2-112. The frame 2-104 is fixedly disposed on the top wall 2-102T of the casing 2-102, and the first magnet 2-M11 and the second magnet 2-M12 may be also fixedly disposed on the frame 2-104 and on the casing 2-102. In addition, the frame 2-104 has a frame protrusion 2-104P that extends toward the base 2-112 (FIG. 2-2).

As shown in FIG. 2-2 and FIG. 2-3, in this embodiment, the driving coil 2-DCL can be a winding coil and is disposed surround the holder 2-108. In addition, the driving coil 2-DCL corresponds to the first magnet 2-M11 and the second magnet 2-M12. When the driving coil 2-DCL is provided with electricity, the driving coil 2-DCL acts with the first magnet 2-M11 and the second magnet 2-M12 to generate an electromagnetic driving force, to drive the holder 2-108 and the optical element to move along a direction of the optical axis 2-O (the Z-axis) relative to the base 2-112.

Furthermore, as shown in FIG. 2-2 and FIG. 2-3, in this embodiment, the outer portion of the first elastic member 2-106 is fixed to the frame 2-104. Similarly, the outer portion of the second elastic member 2-110 is fixed to four corners of the base 2-112. In addition, the inner portions of the first elastic member 2-106 and the second elastic member 2-110 are respectively connected to the upper side and the lower side of the holder 2-108, so that the holder 2-108 can be movably connected to the frame 2-104 through the first elastic member 2-106 and the second elastic member 2-110, and therefore the holder 2-108 can be suspended in the frame 2-104 (as shown in FIG. 2-3). Therefore, the driving assembly can drive the holder 2-108 to move relative to the frame 2-104.

Figures 1, 2, 3, 4:
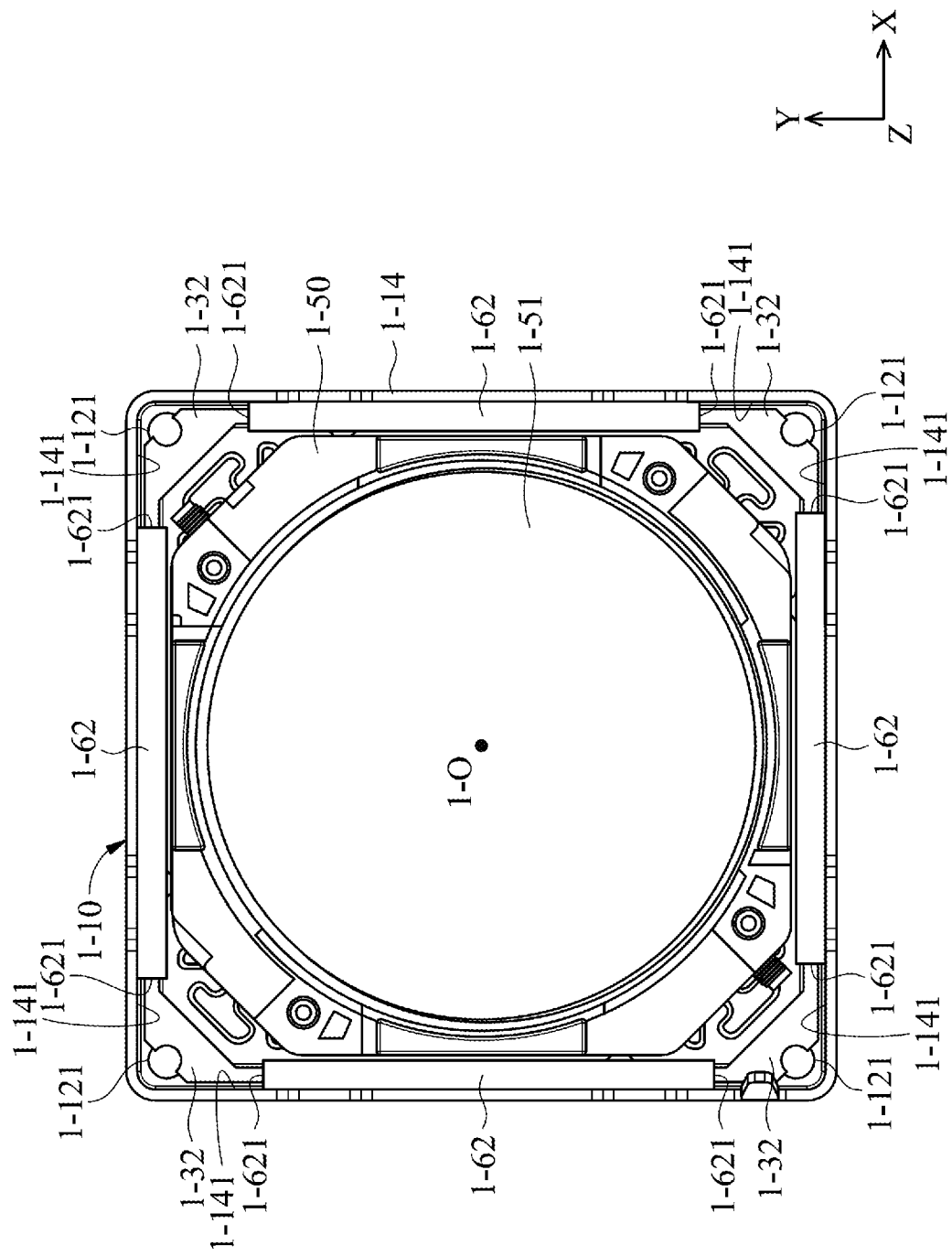
Figures 1, 2, 3, 4, 5:
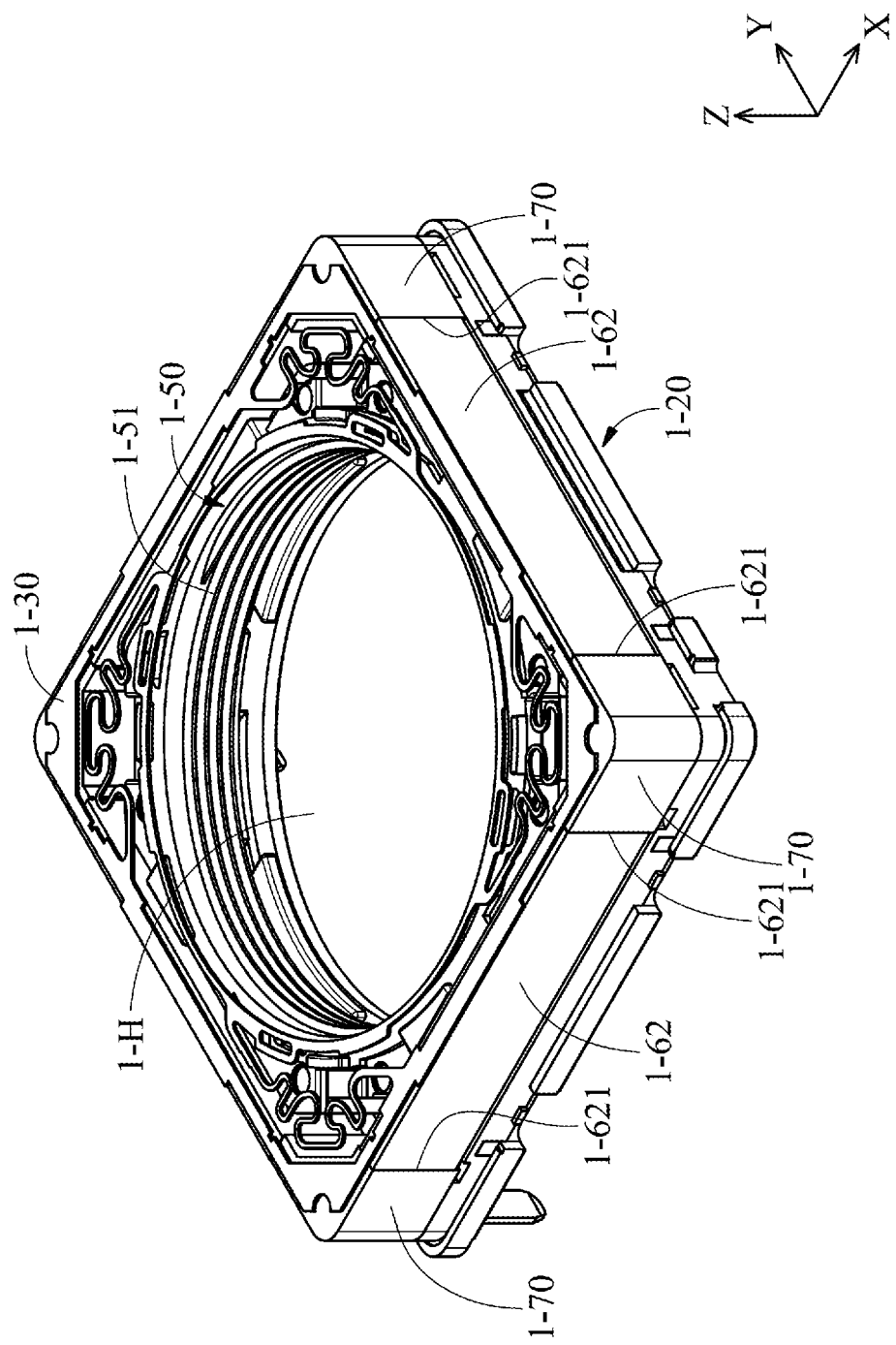
Figures 1, 2, 3, 4, 5, 6:
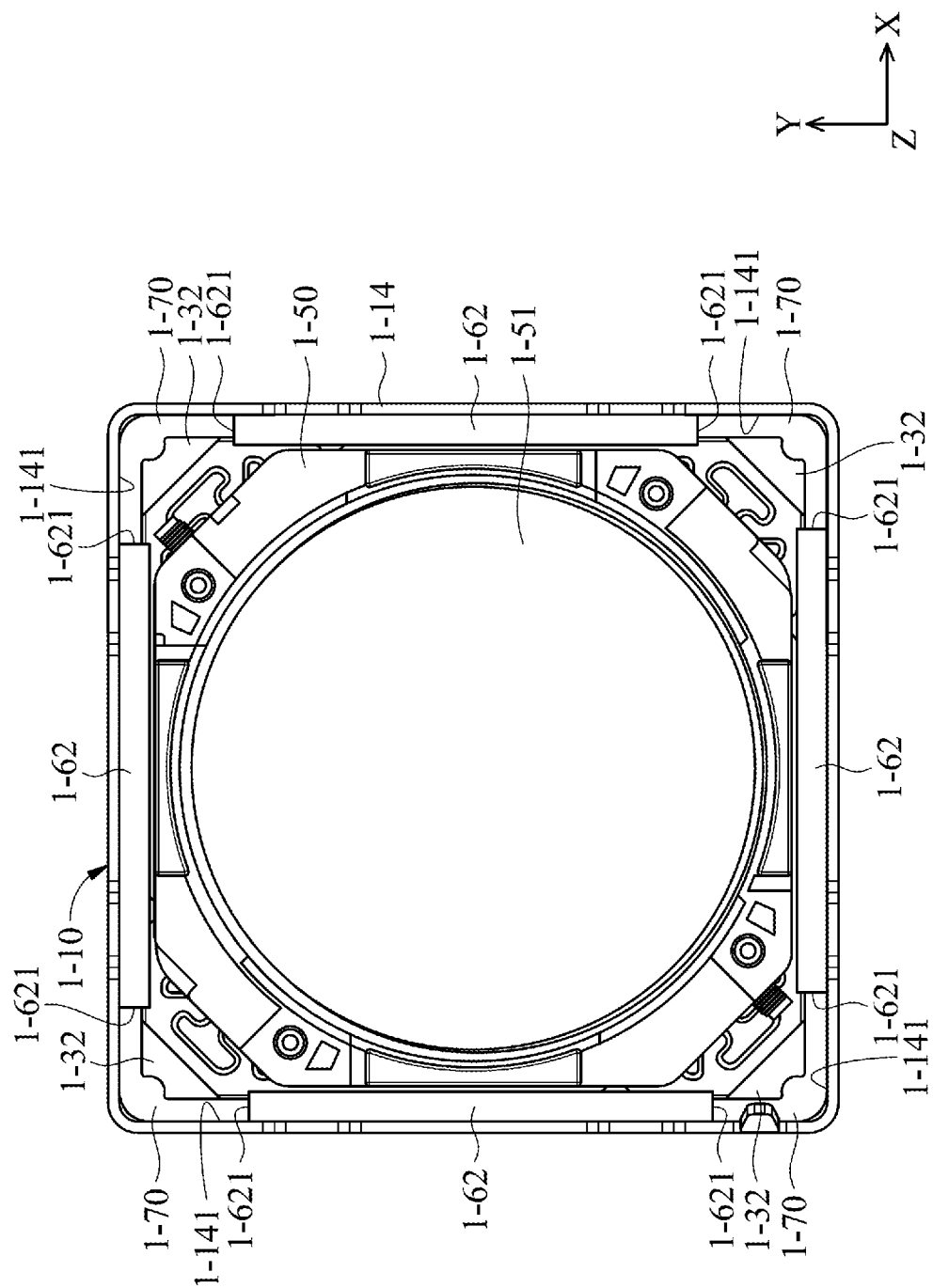
Figures 1, 2, 3, 4, 5, 6, 7:
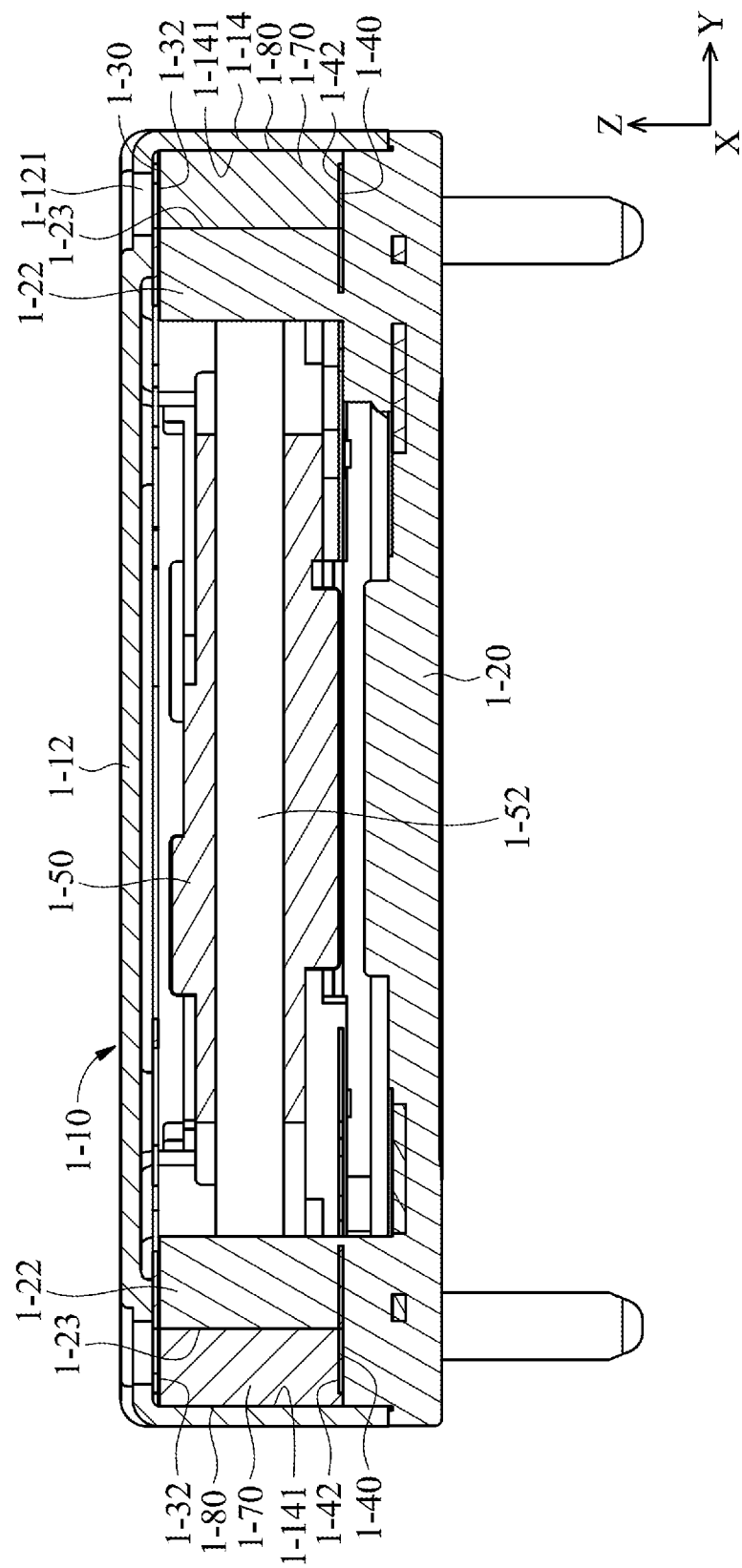
Figures 1, 2, 3, 4, 5, 6, 7, 8:
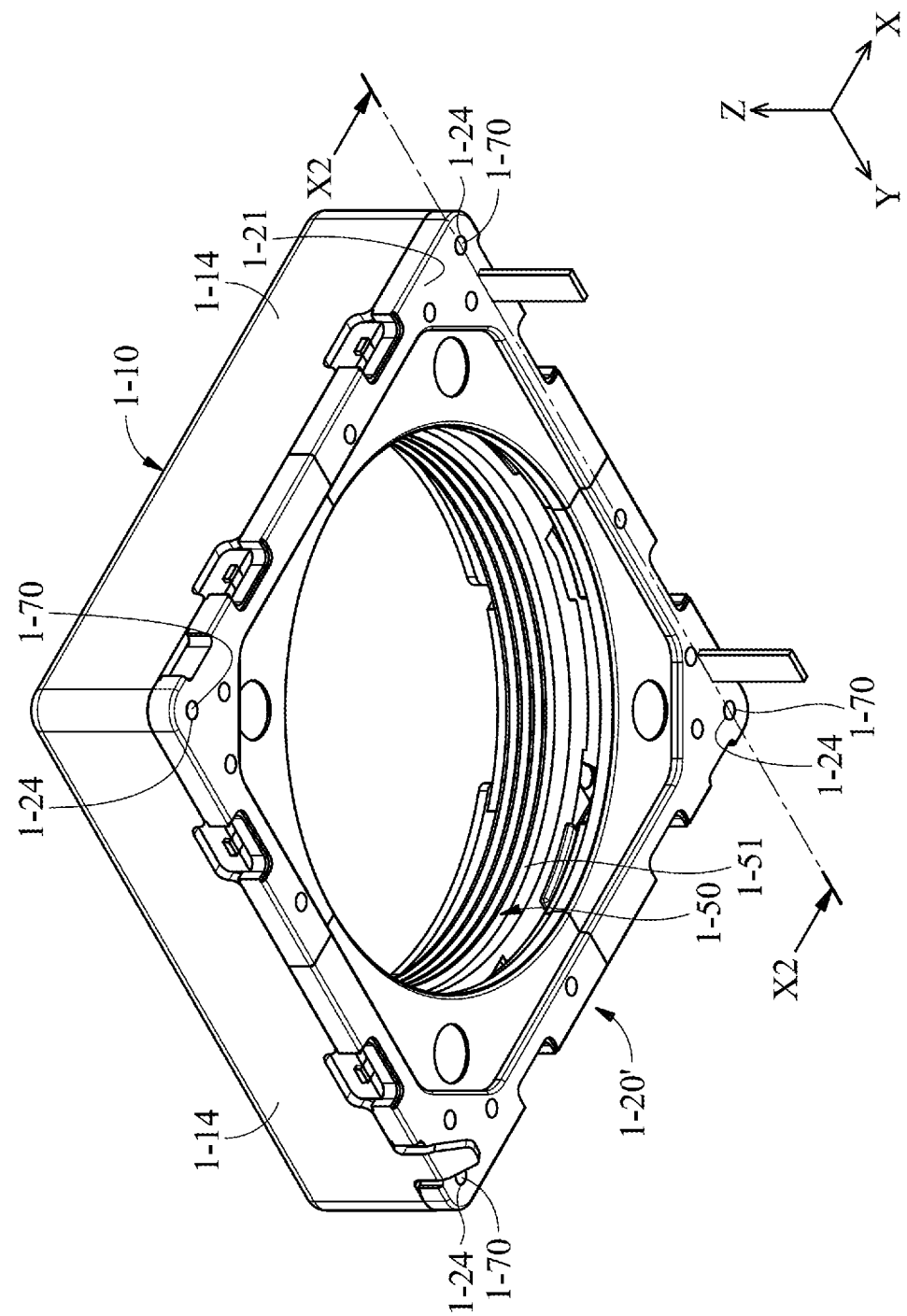
Figures 1, 2, 3, 4, 5, 6, 7, 8, 9:
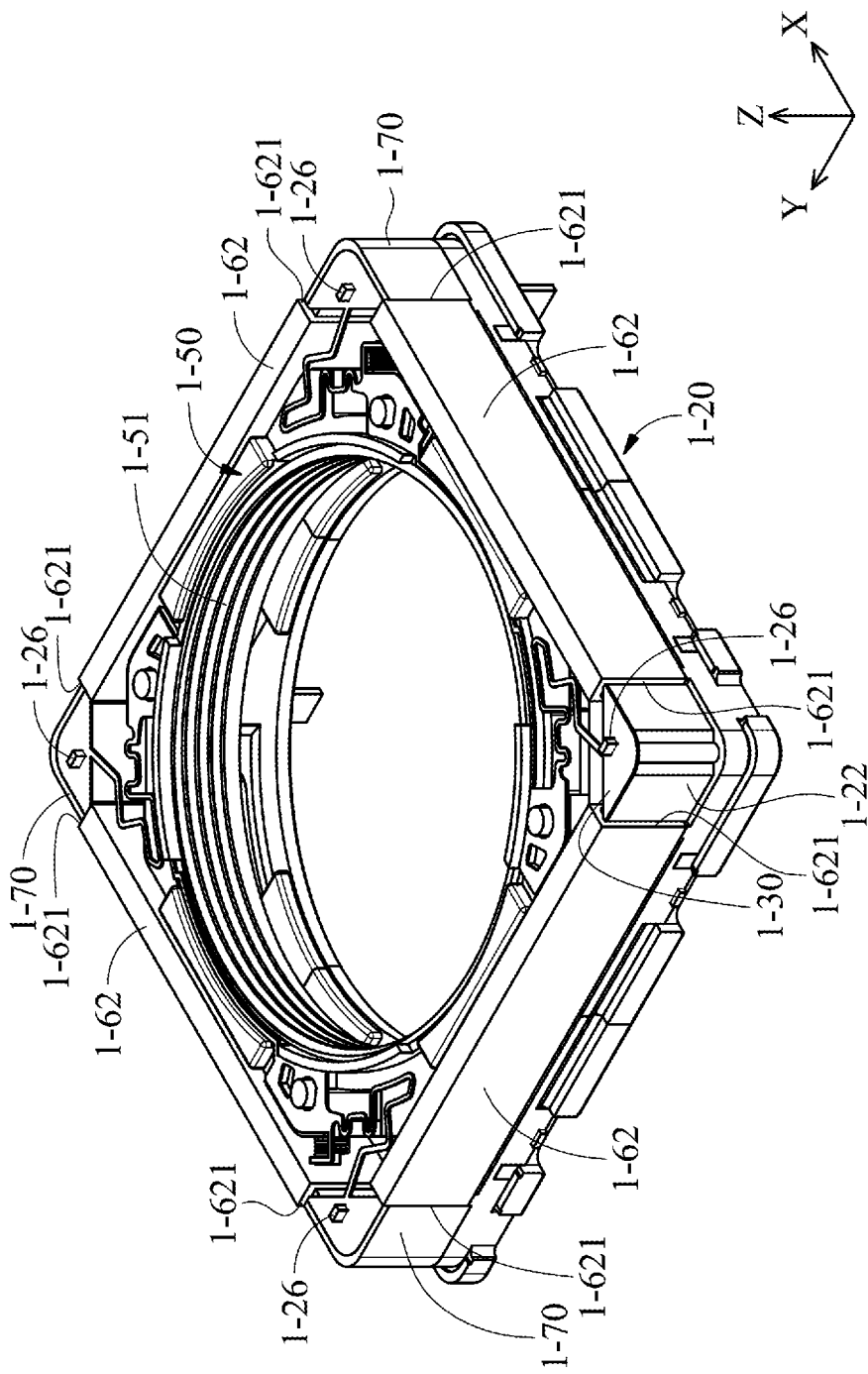
Figures 1, 2, 3, 4, 5, 6, 7, 8, 9, 10:
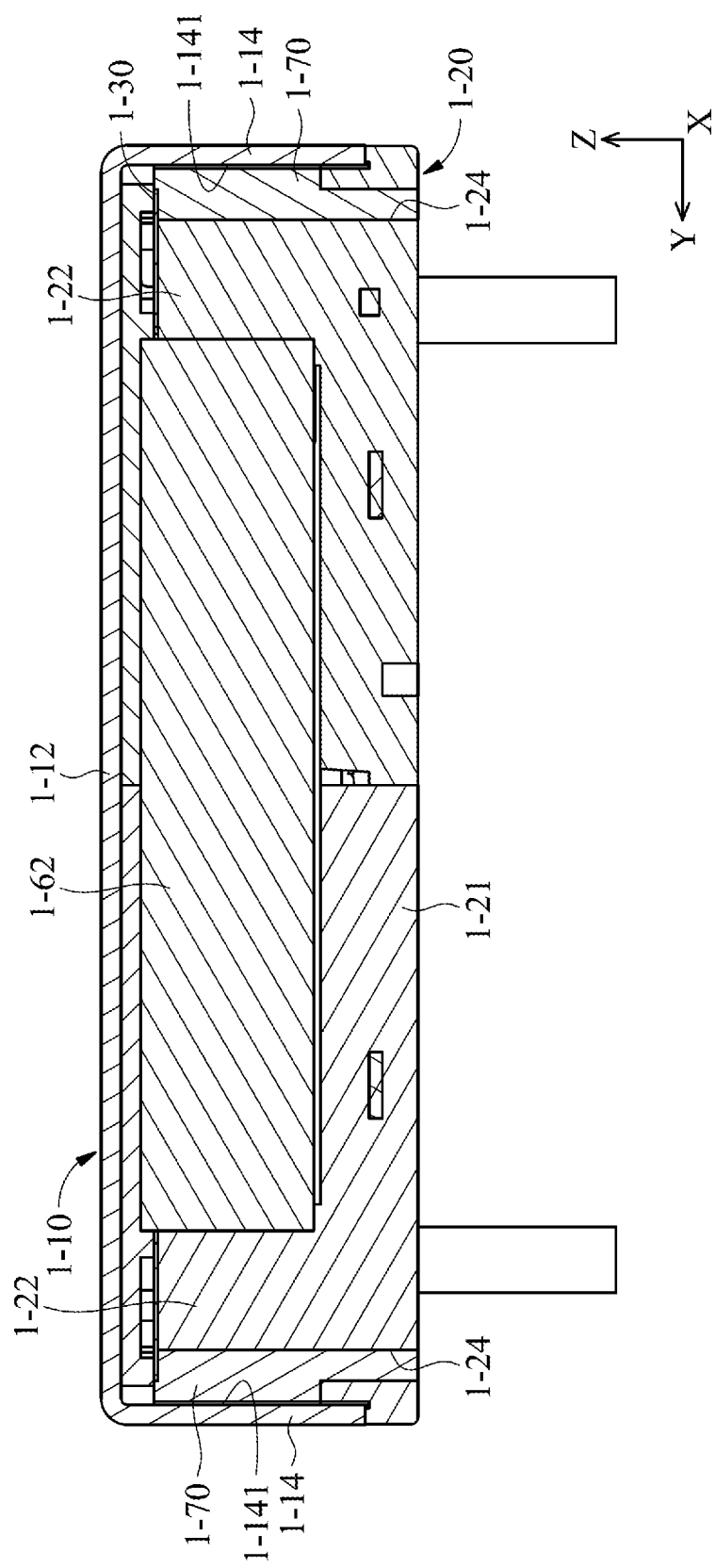
Figures 1, 2, 3, 4, 5, 6, 7, 8, 9, 10, 11:
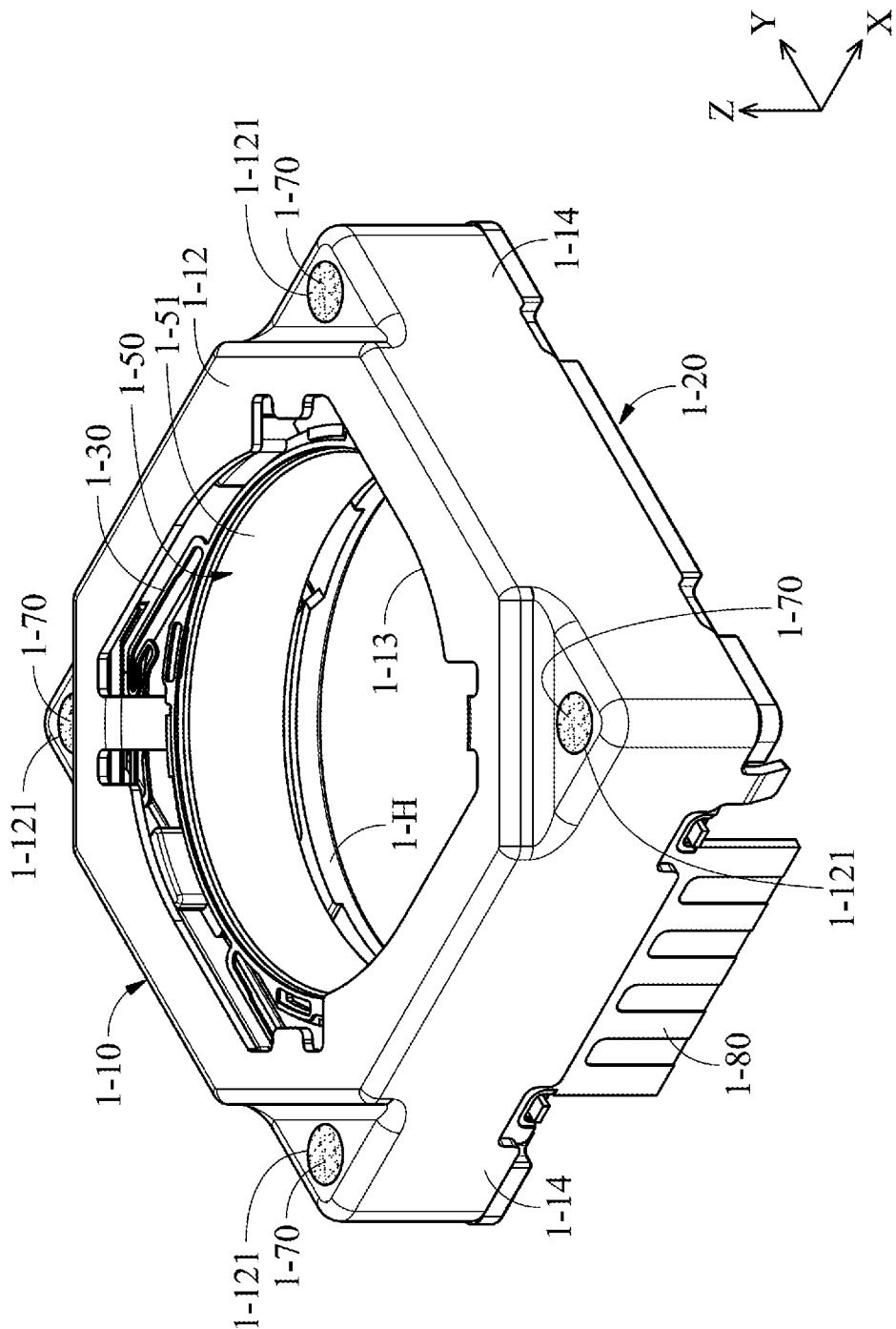
Figures 1, 2, 3, 4, 5, 6, 7, 8, 9, 10, 11, 12:
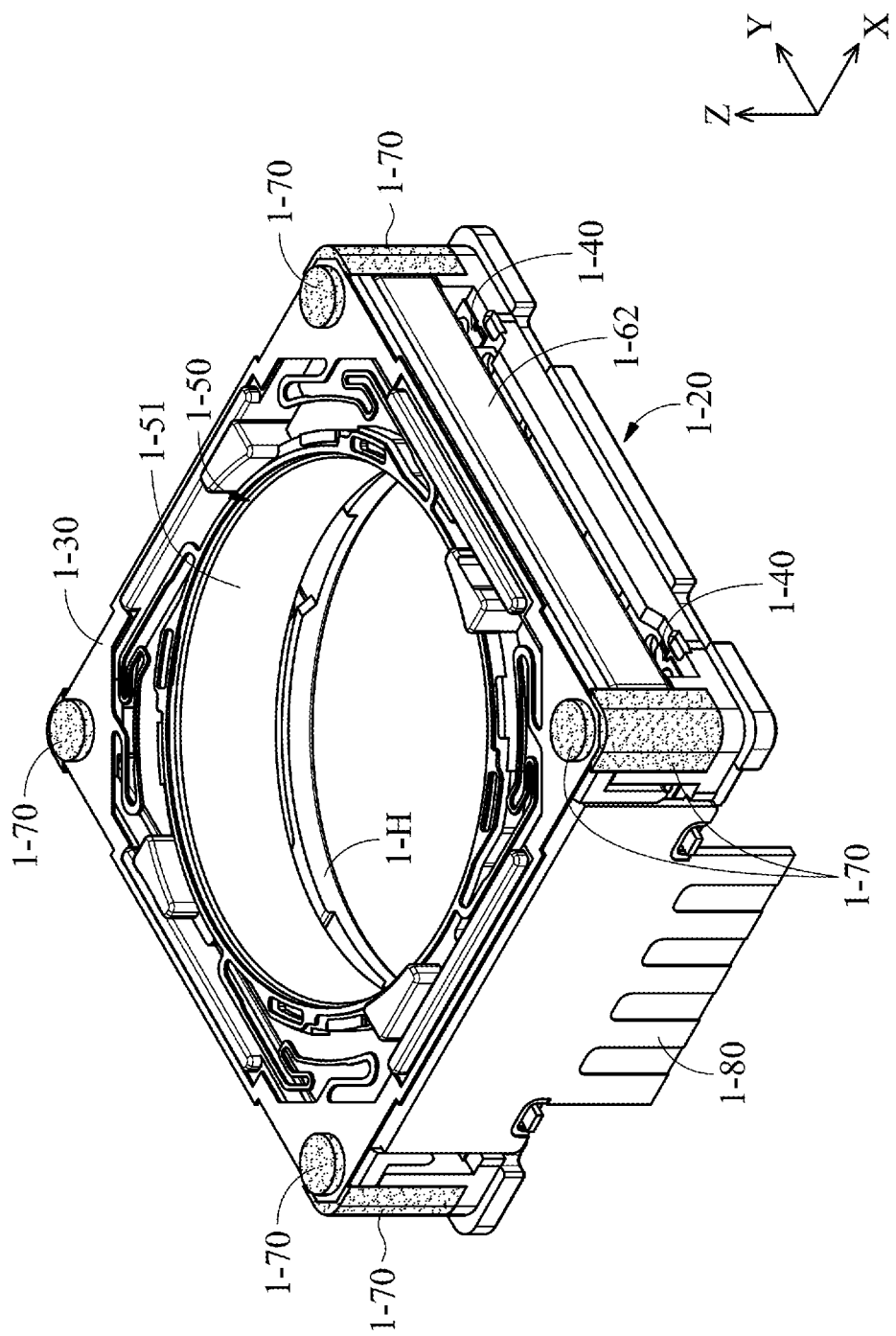
Figures 1, 2, 3, 4, 5, 6, 7, 8, 9, 10, 11, 12, 13:
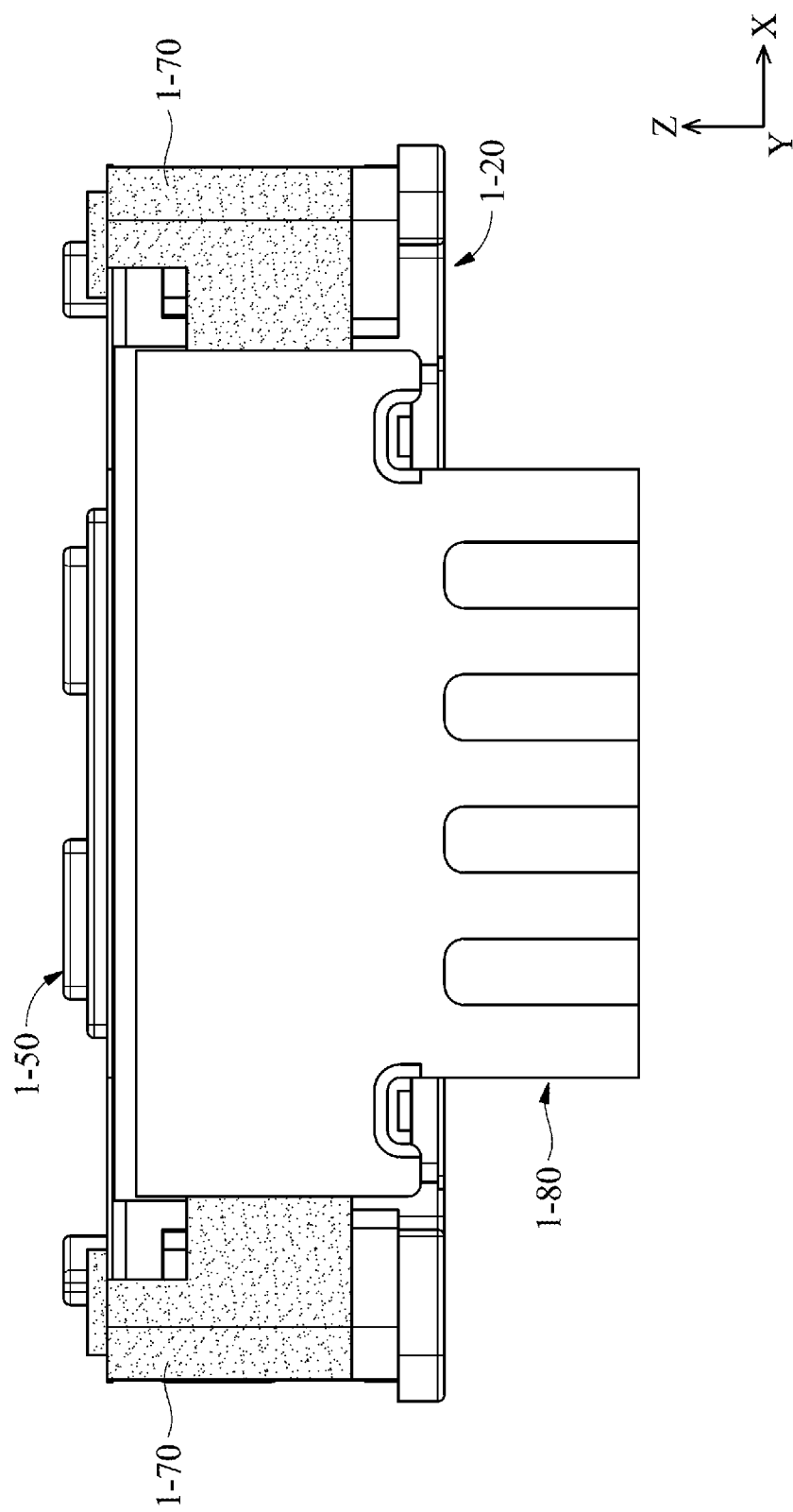
Figures 1, 2, 3, 4, 5, 6, 7, 8, 9, 10, 11, 12, 13, 14:
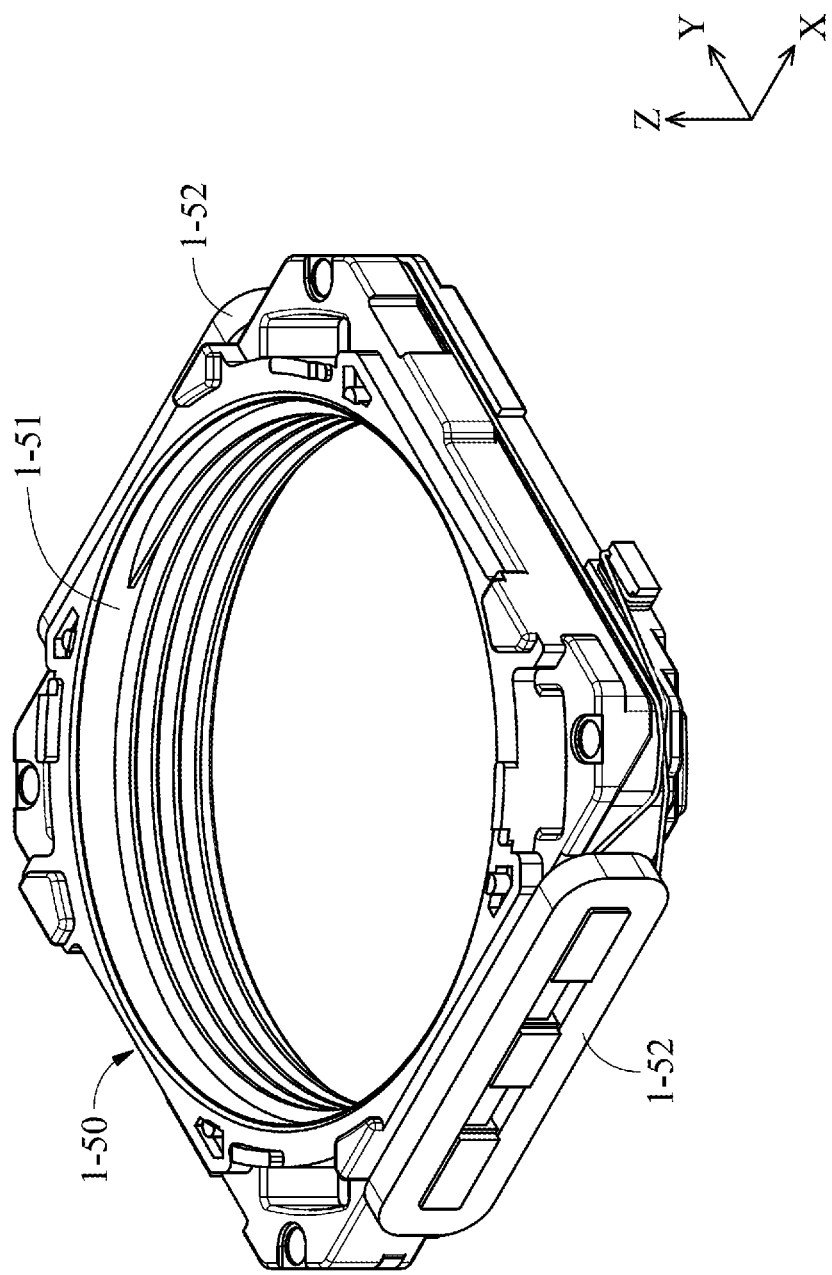
Figures 1, 2:
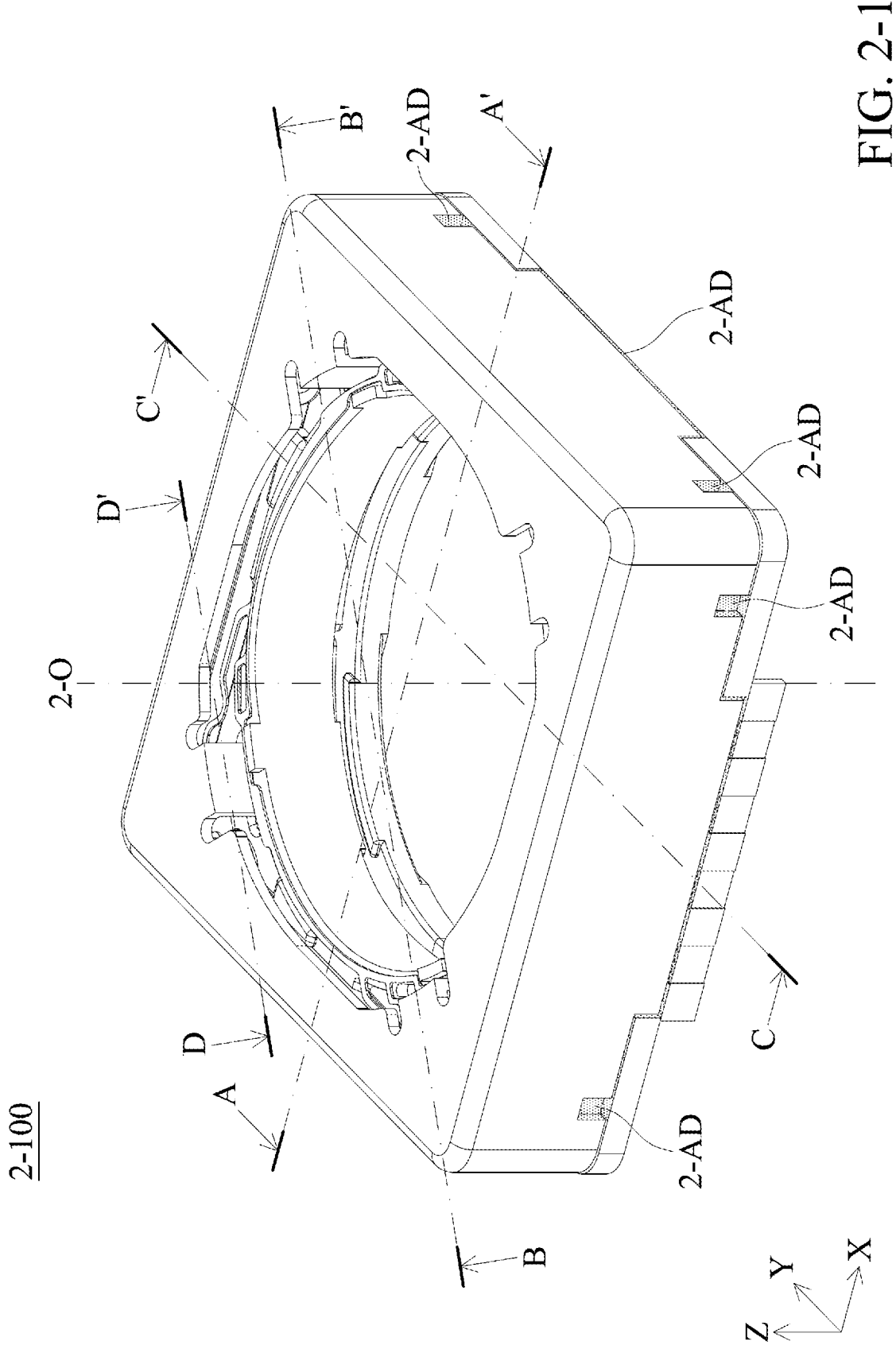
Figure 2:
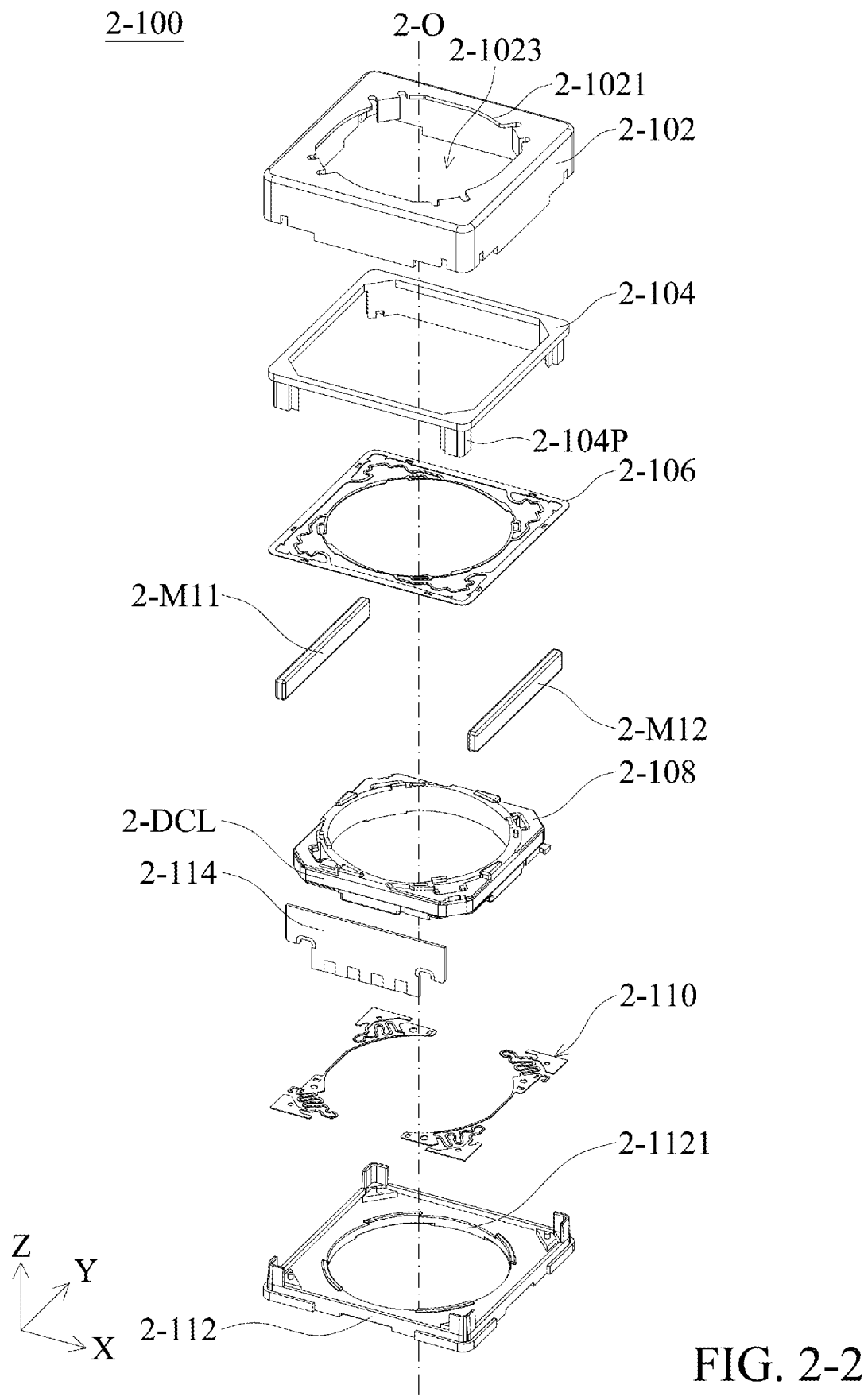
Figures 2, 3:
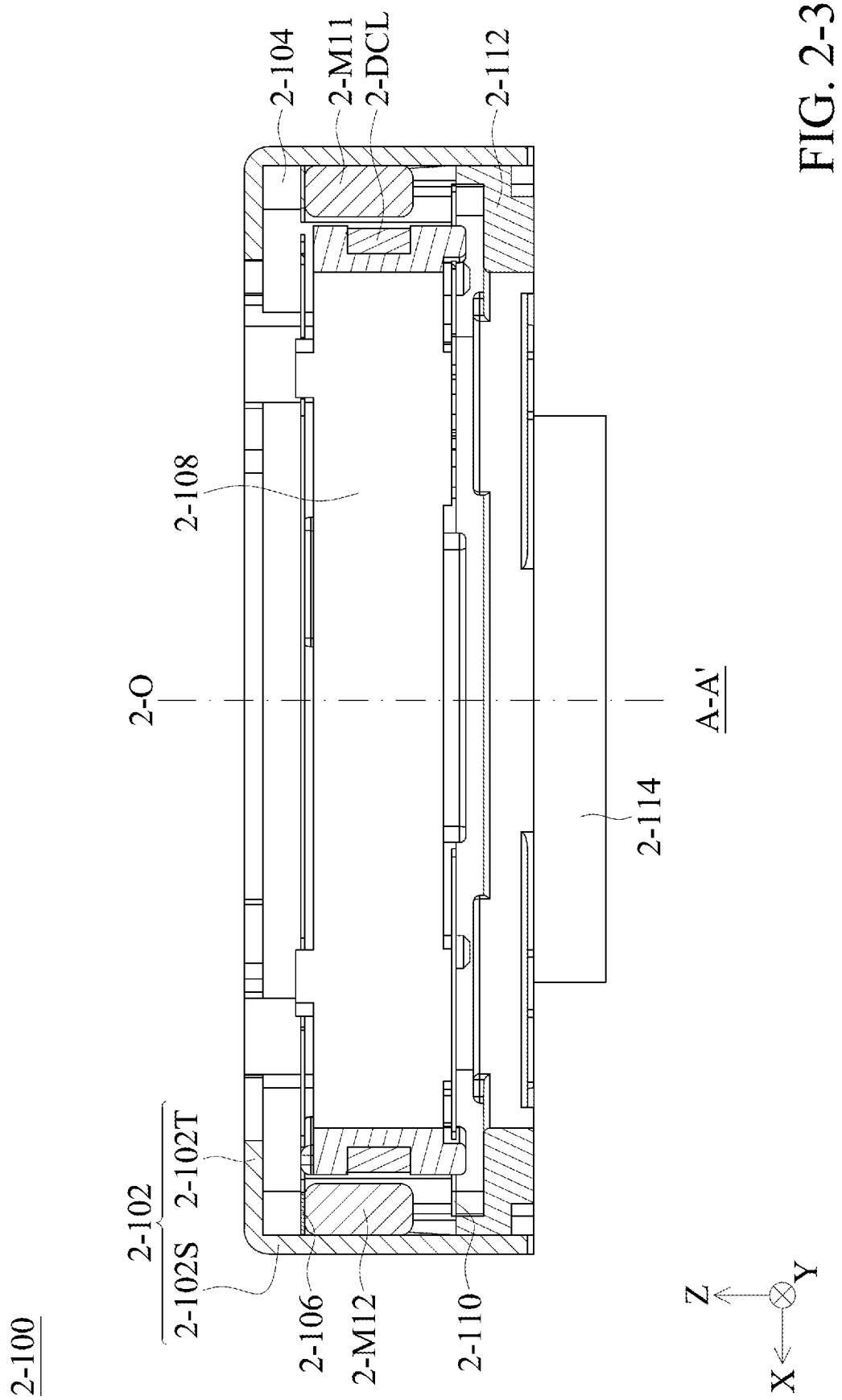
Figures 2, 3, 4:
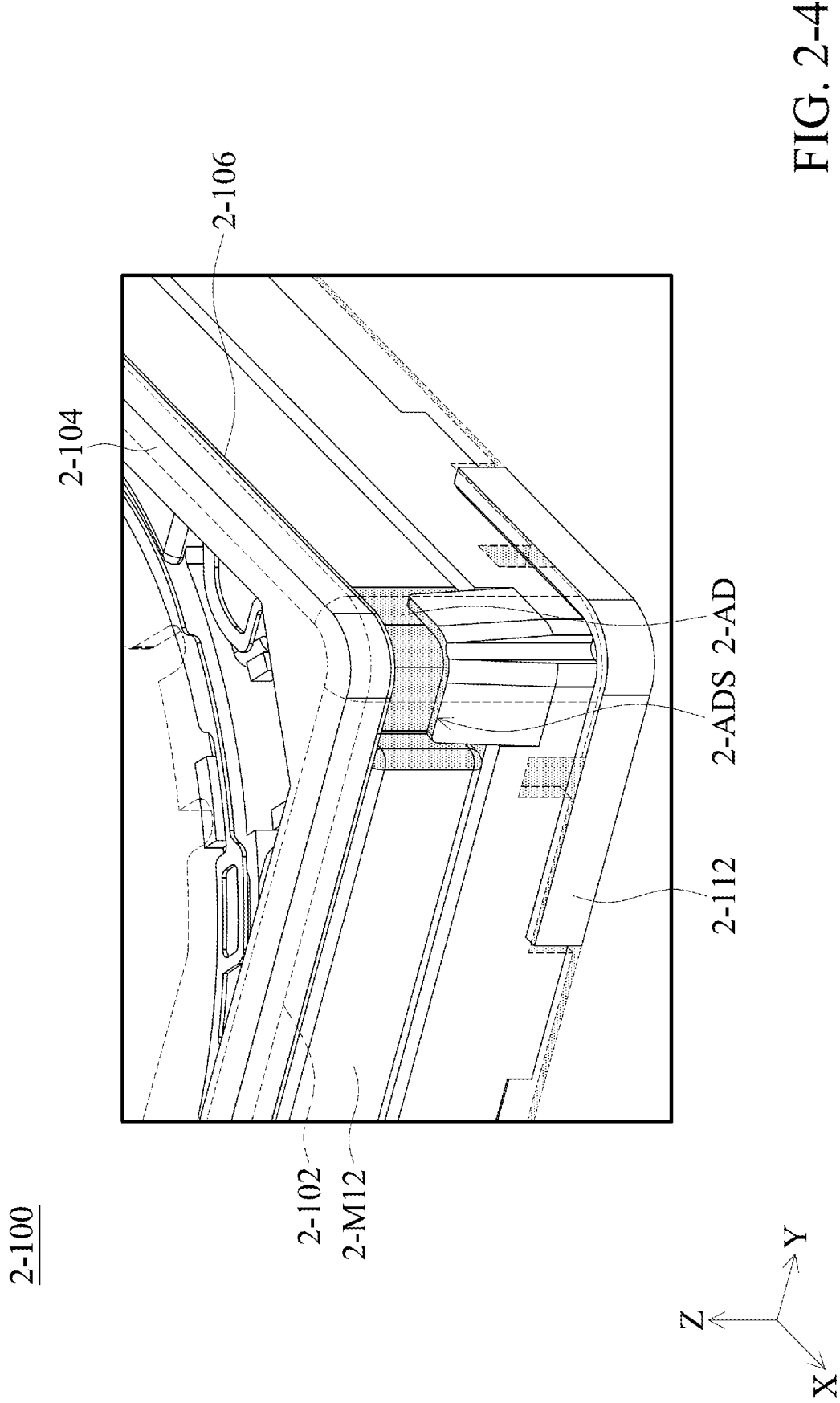
Figures 2, 3, 4, 5:
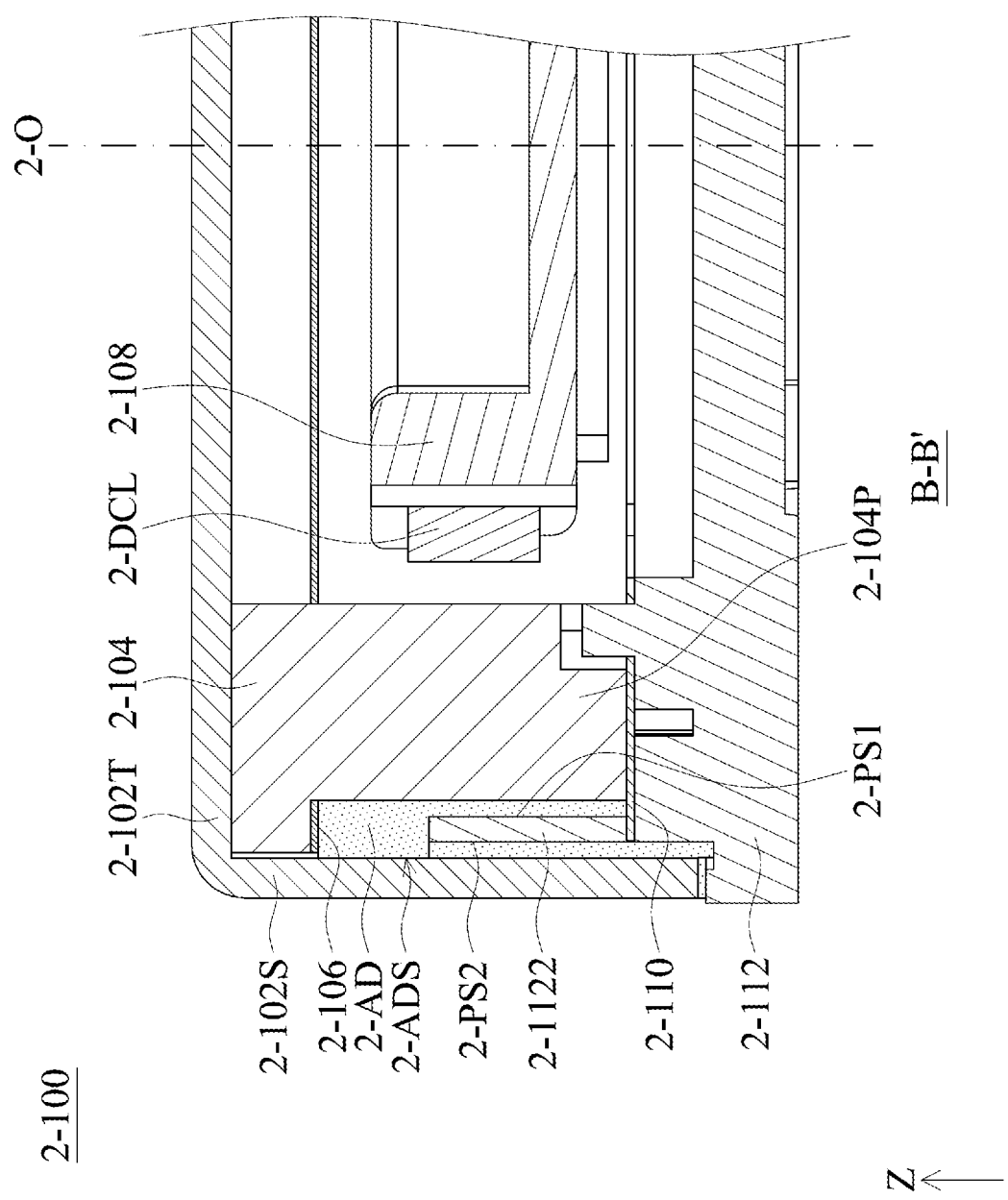
Figures 2, 3, 4, 5, 6:
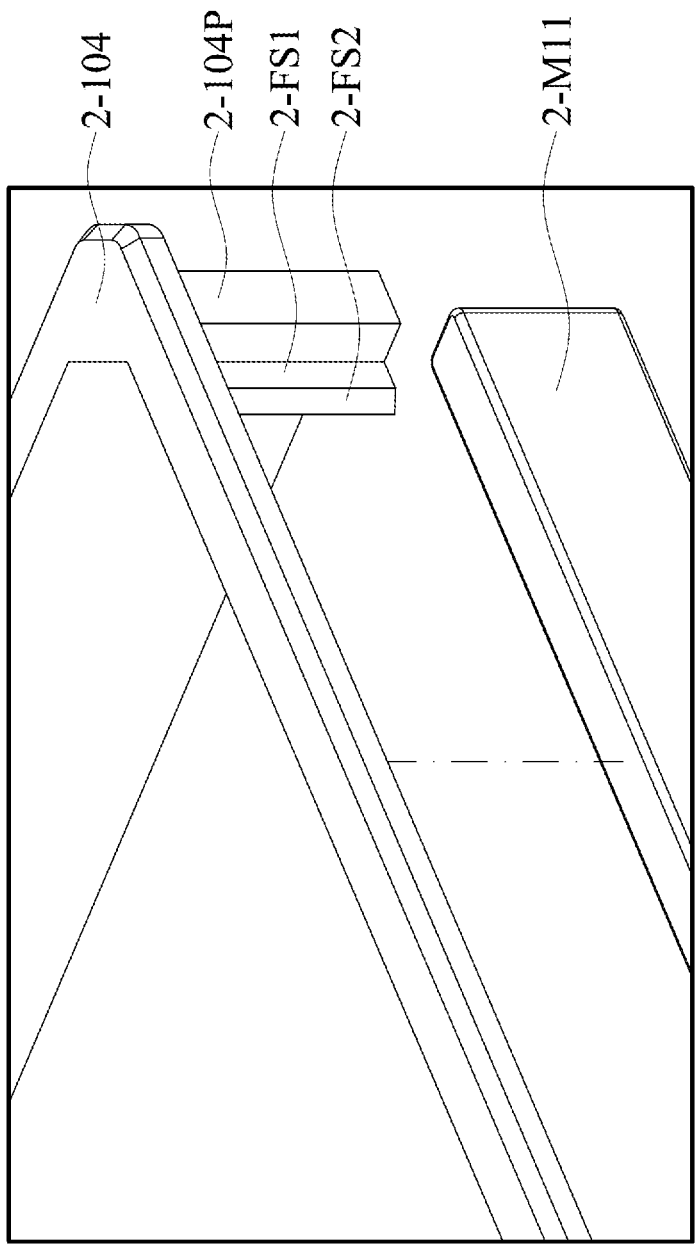
Figures 2, 3, 4, 5, 6, 7:
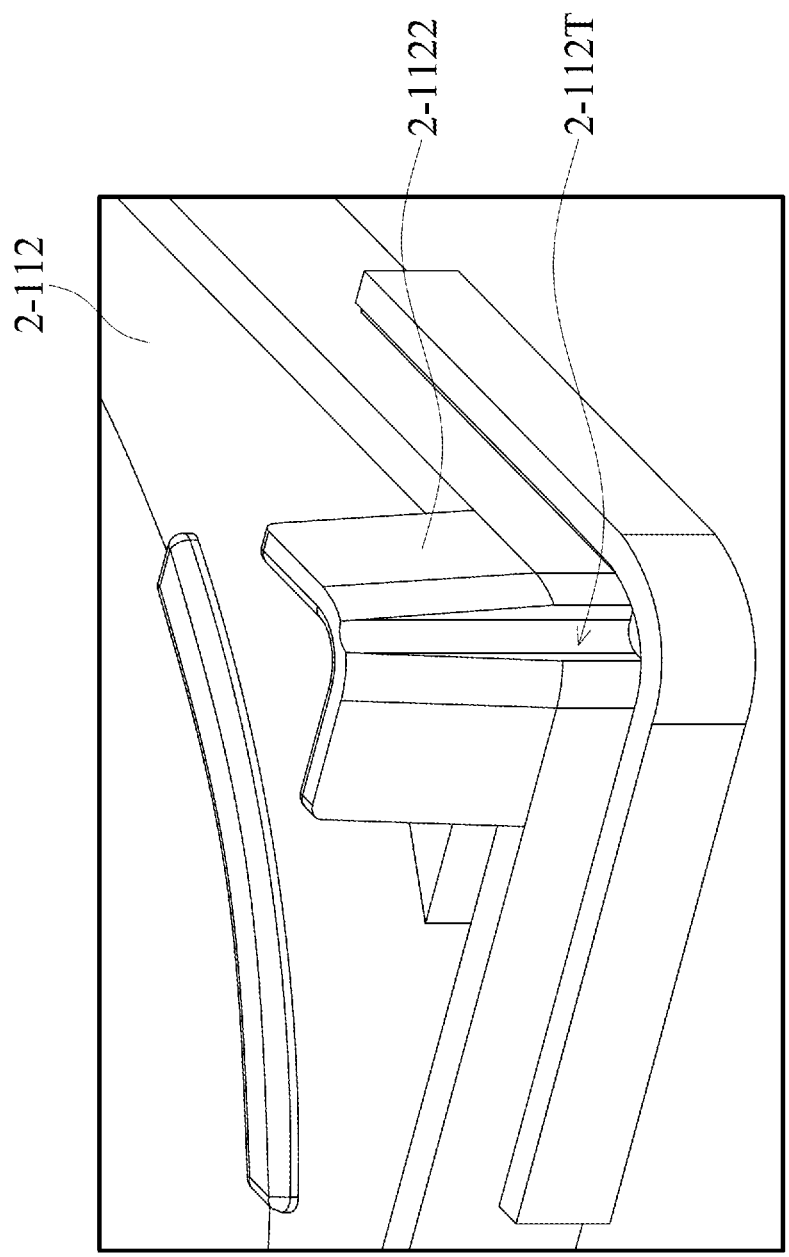
Figures 2, 3, 4, 5, 6, 7, 8:
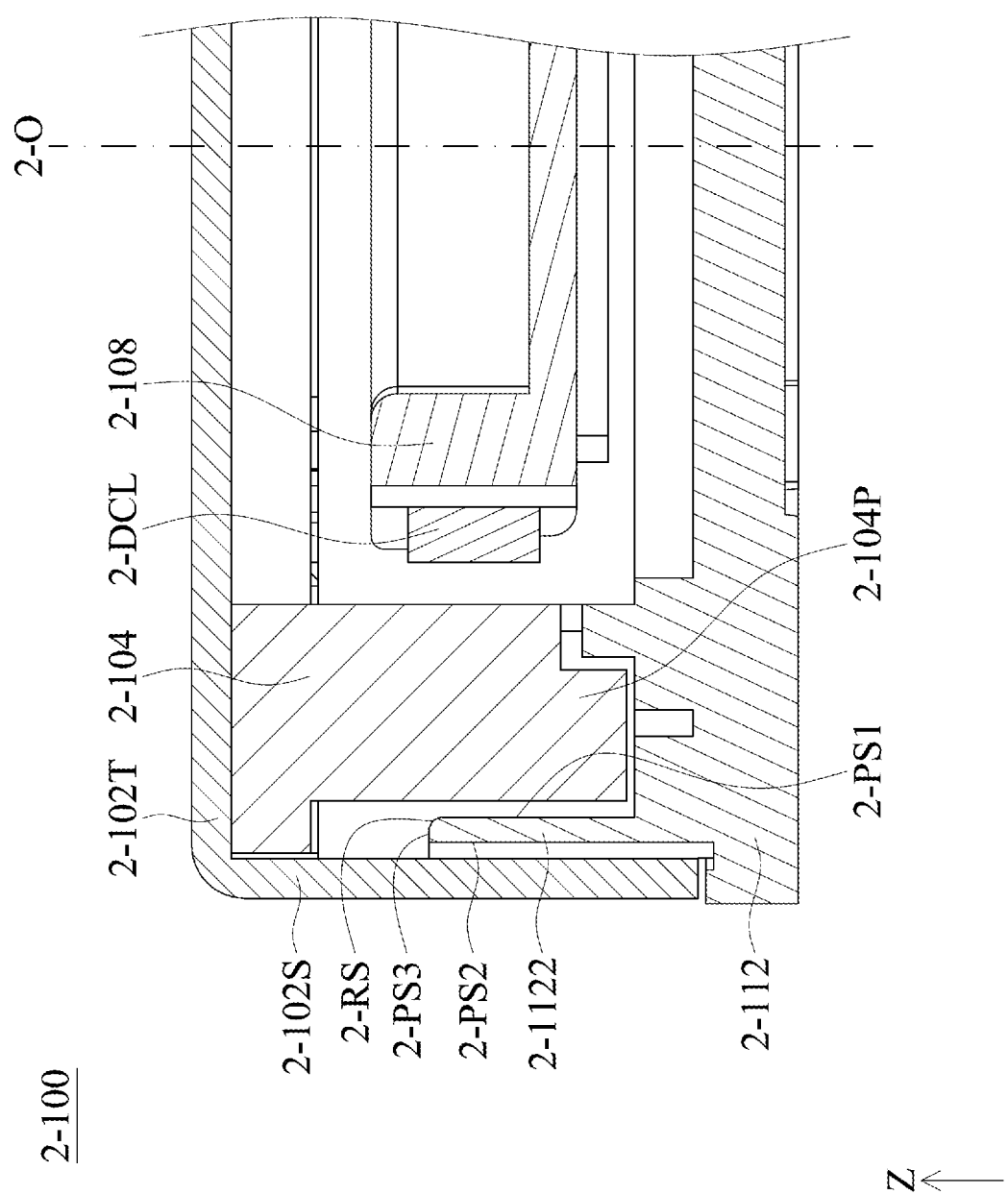
Figures 2, 3, 4, 5, 6, 7, 8, 9:
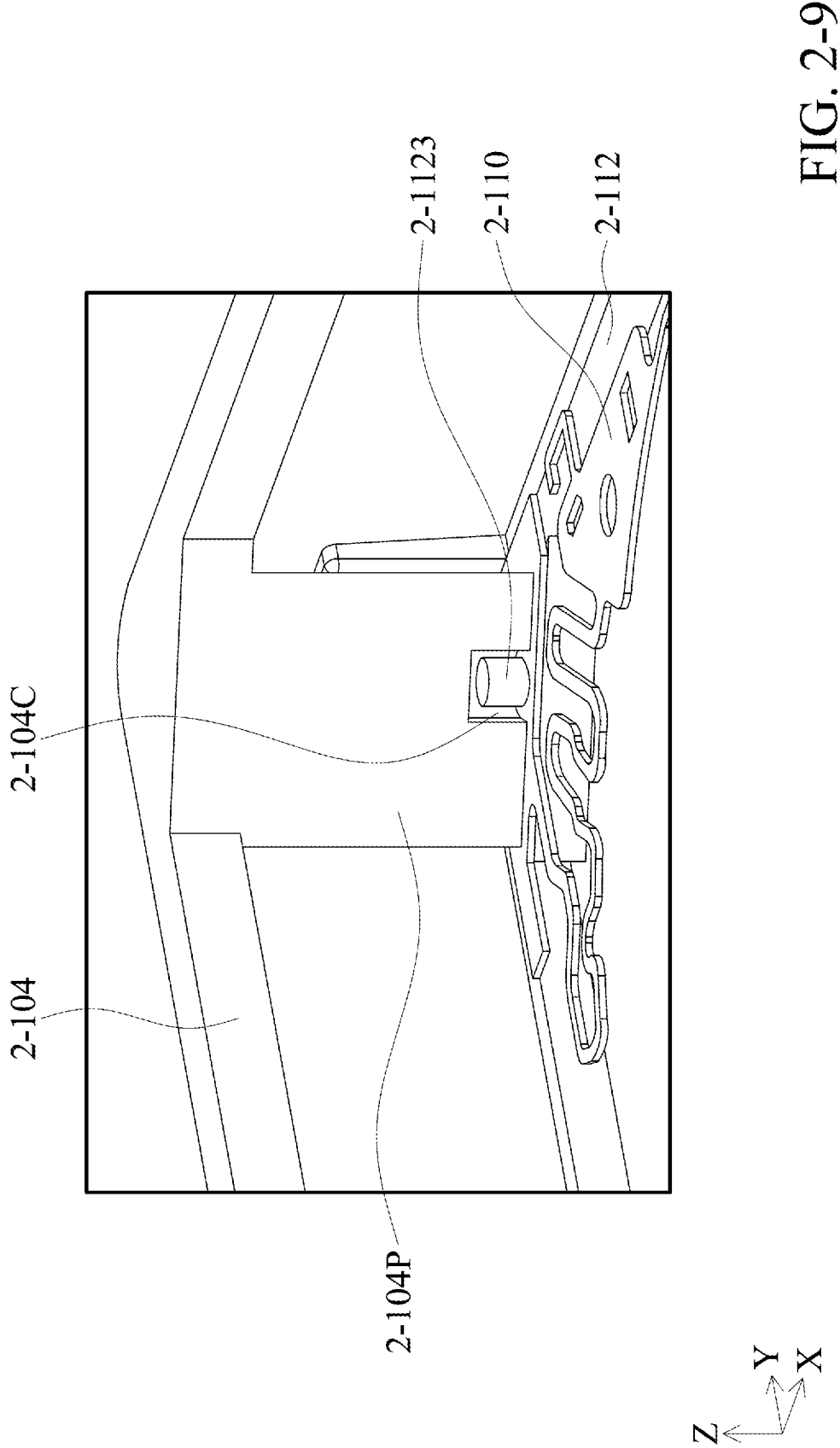
Figures 2, 3, 4, 5, 6, 7, 8, 9, 10:
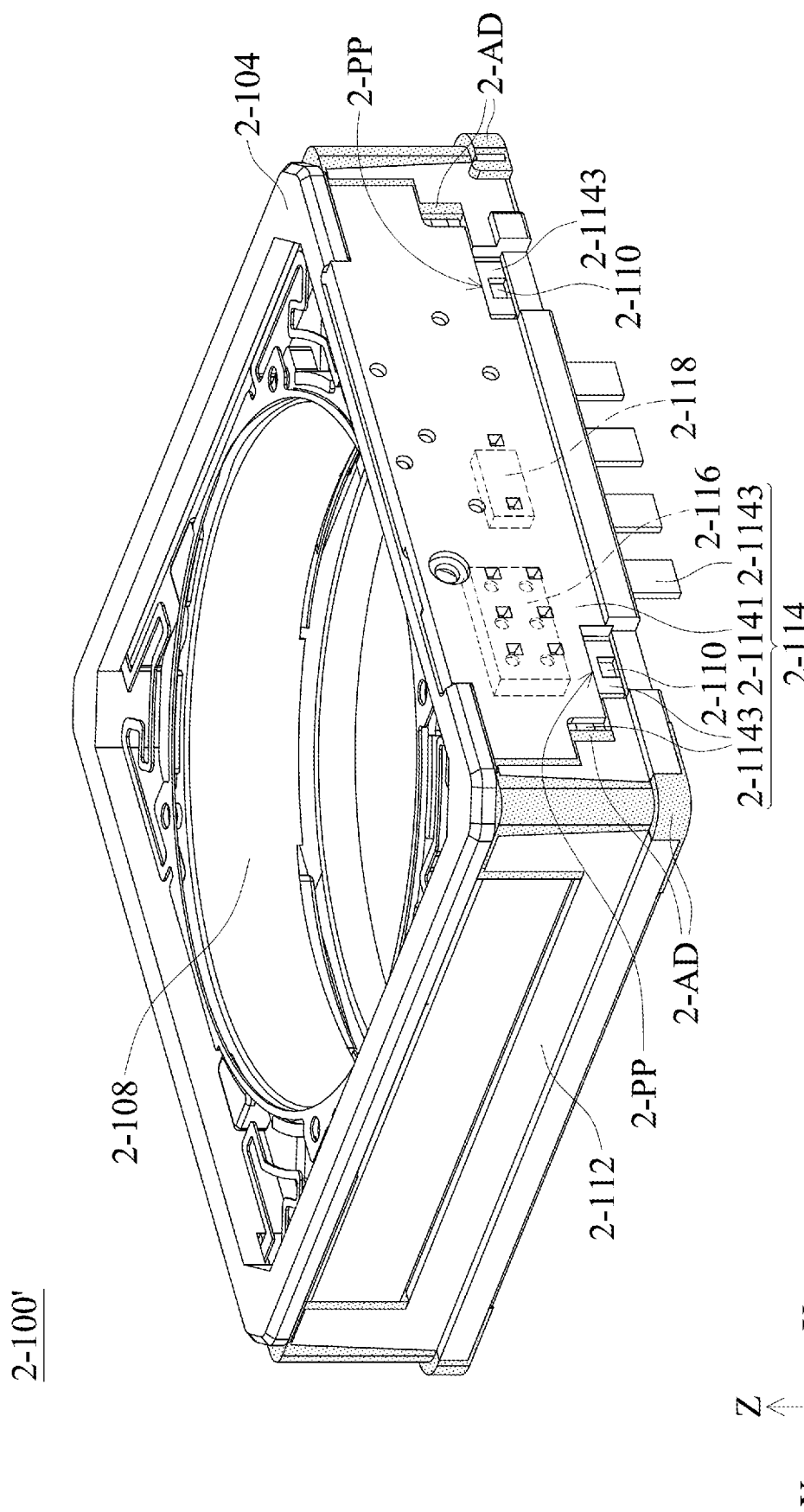
Figures 2, 3, 4, 5, 6, 7, 8, 9, 10, 11:
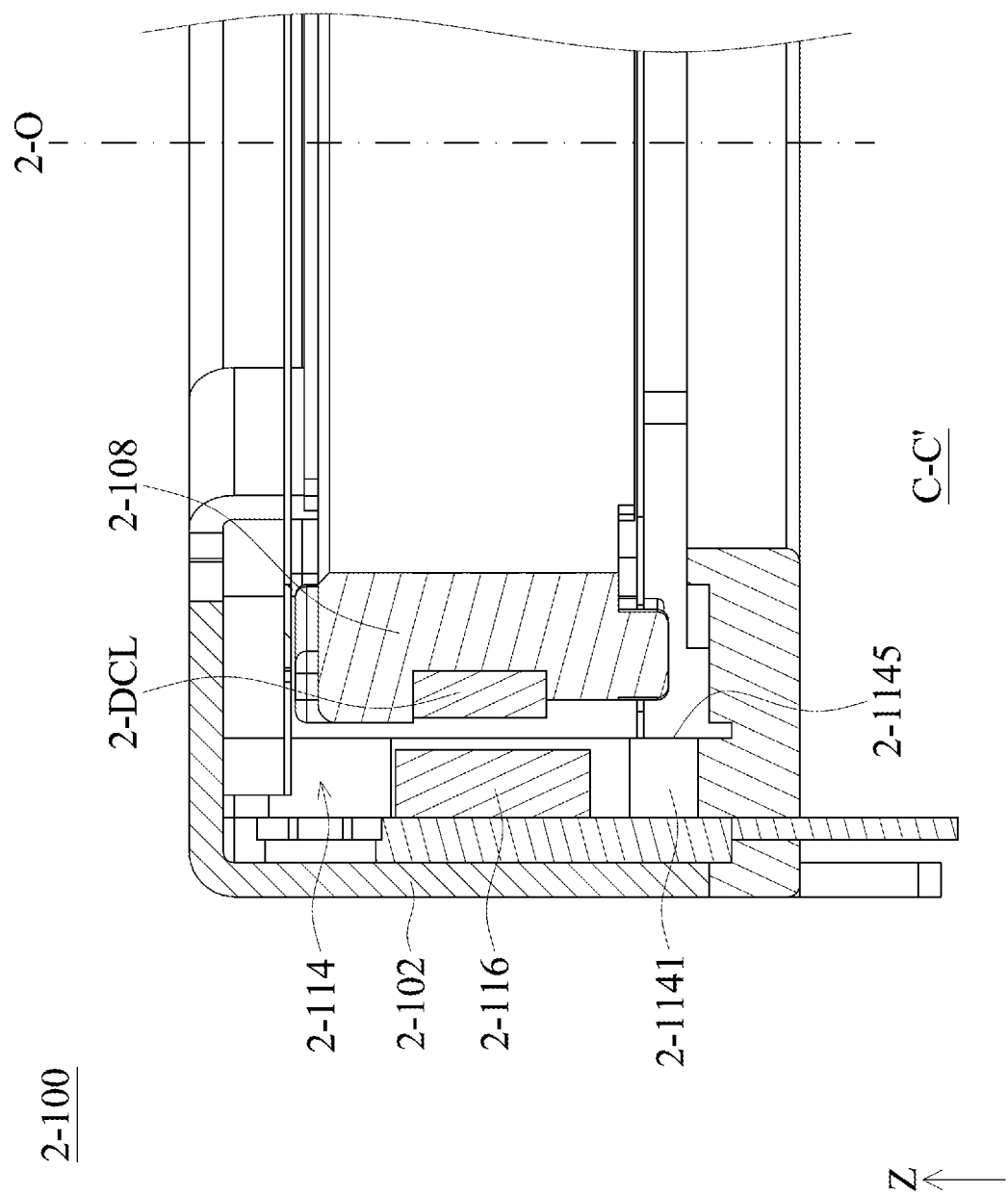
Figures 2, 3, 4, 5, 6, 7, 8, 9, 10, 11, 12:
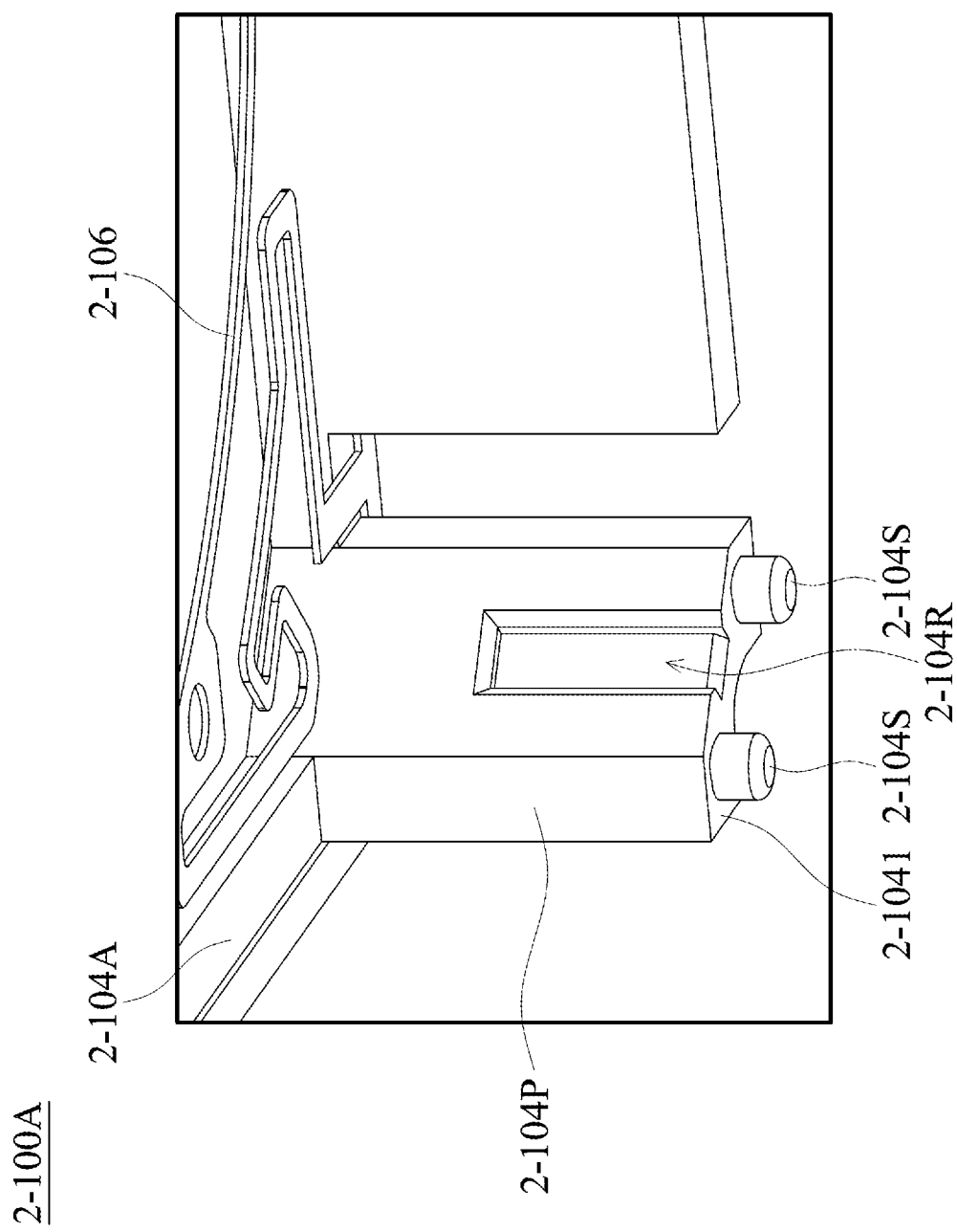
Figures 2, 3, 4, 5, 6, 7, 8, 9, 10, 11, 12, 13:
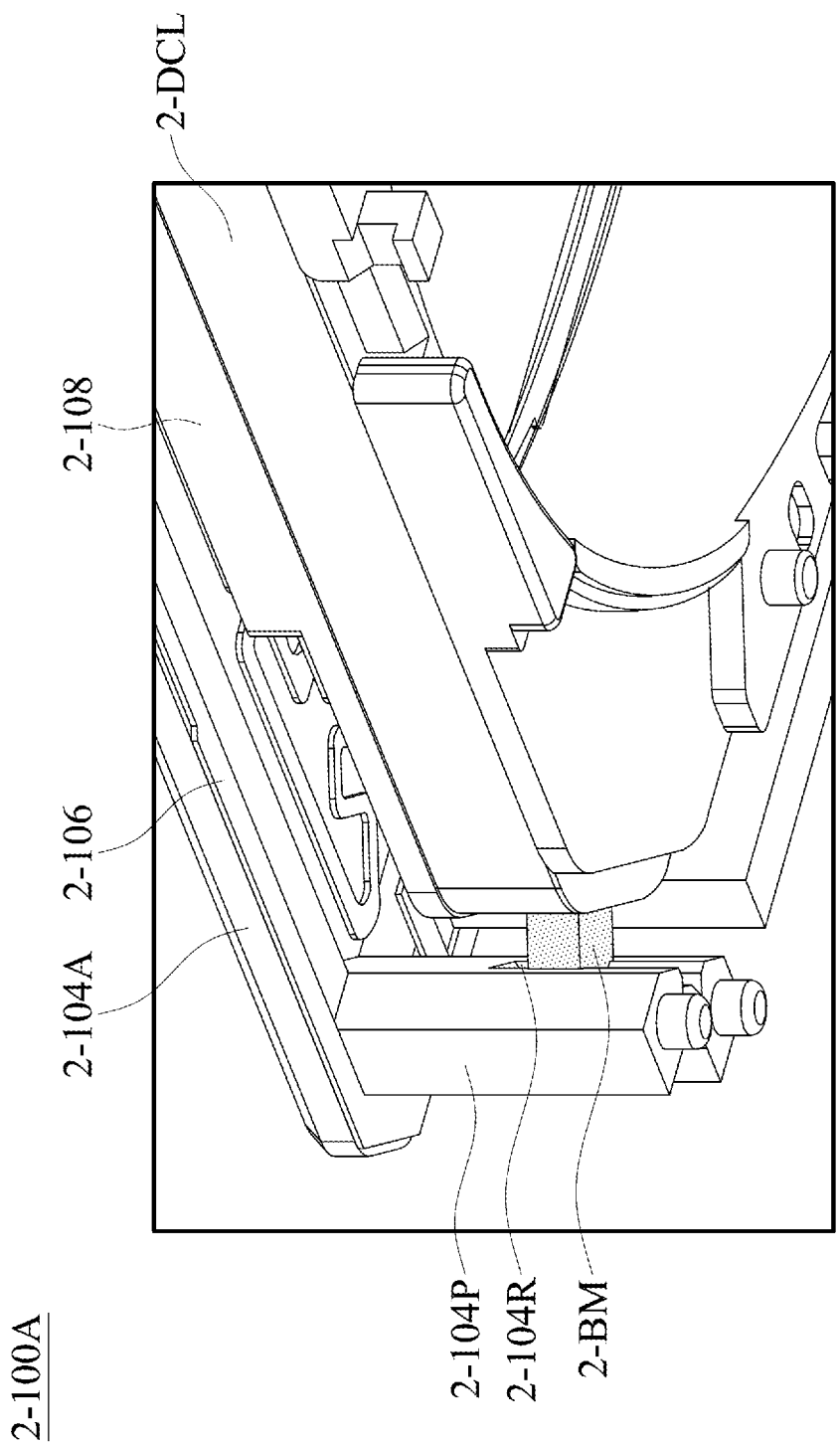
Figures 2, 3, 4, 5, 6, 7, 8, 9, 10, 11, 12, 13, 14:
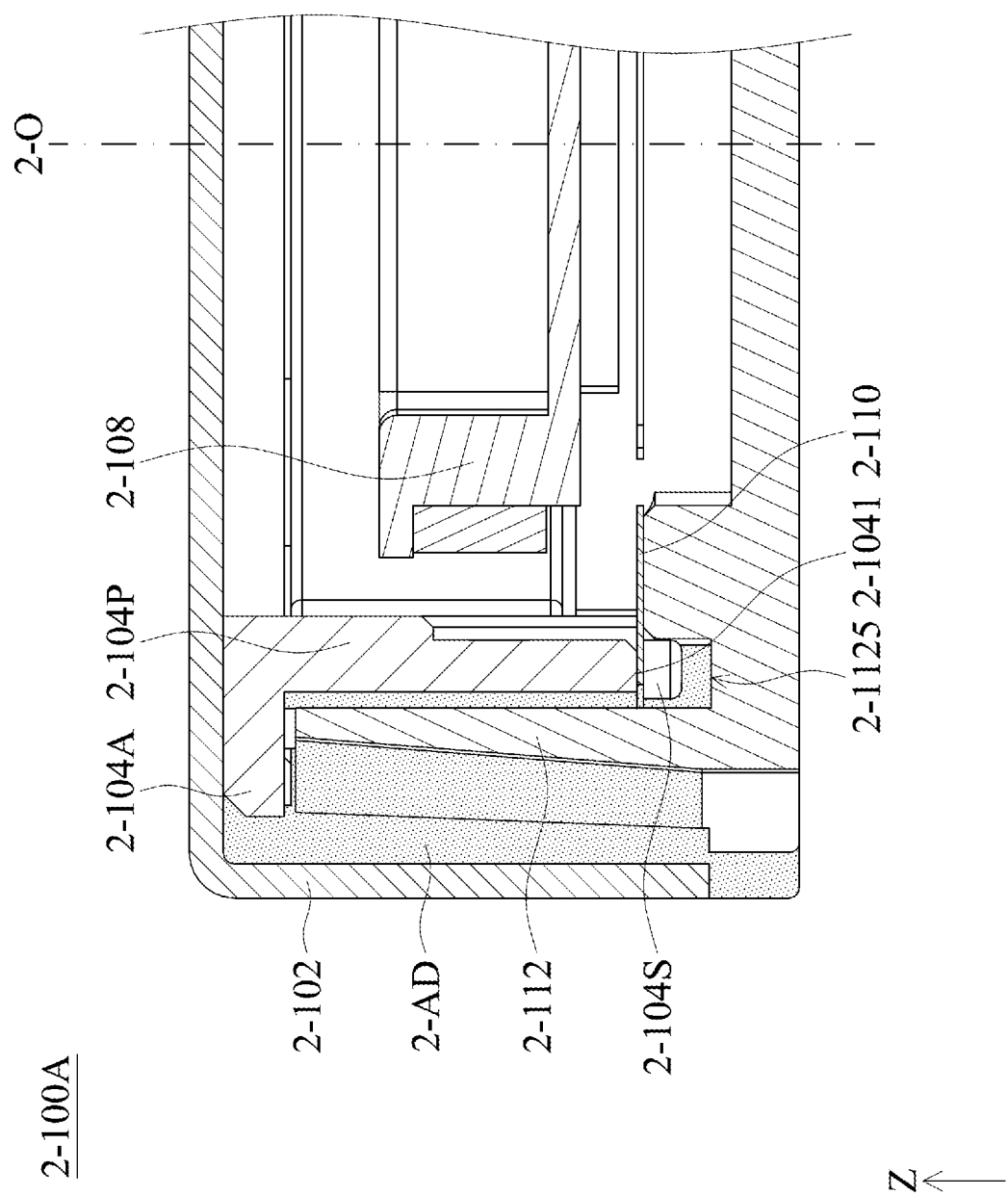
Figures 2, 3, 4, 5, 6, 7, 8, 9, 10, 11, 12, 13, 14, 15:
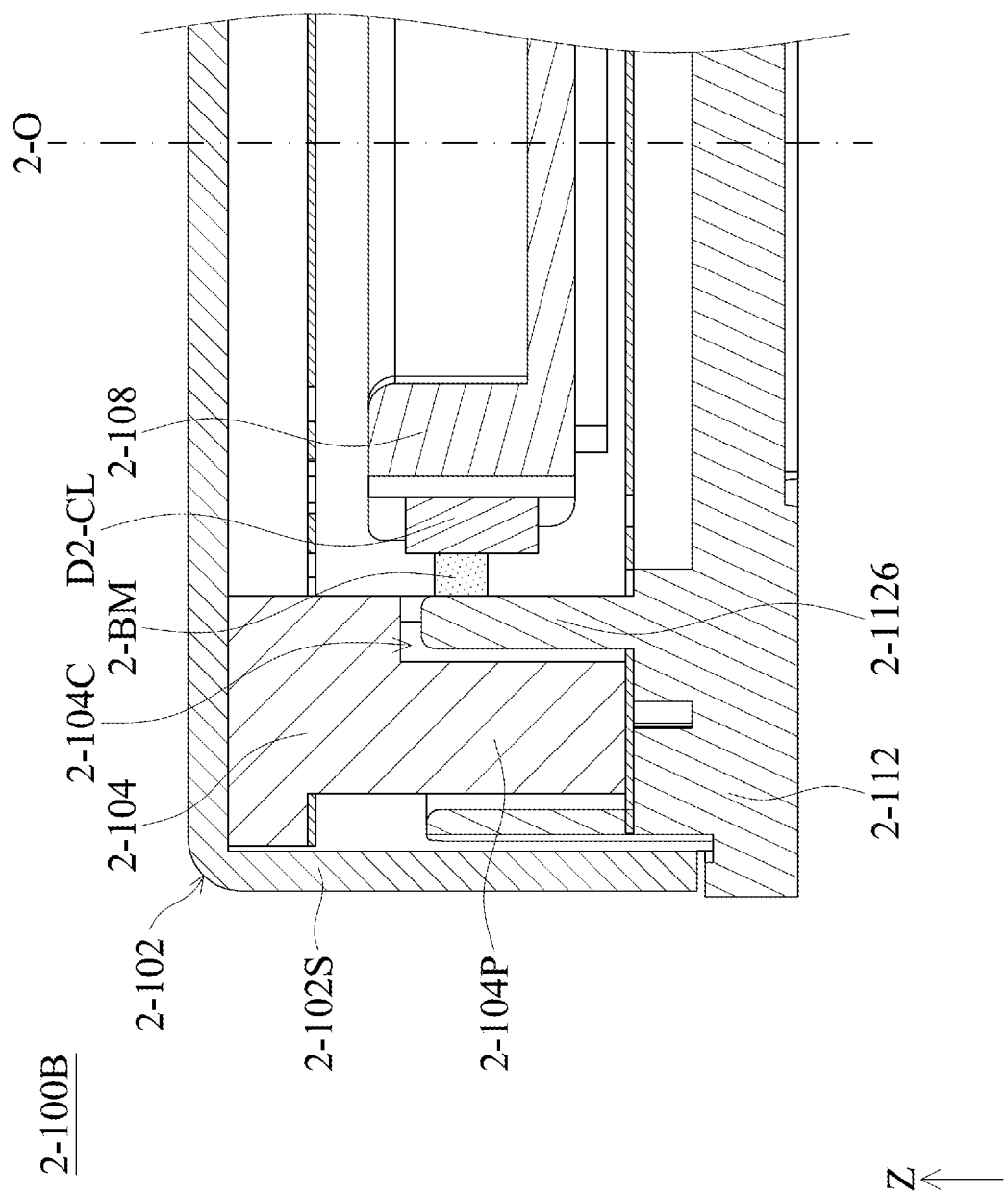
Figures 2, 3, 4, 5, 6, 7, 8, 9, 10, 11, 12, 13, 14, 15, 16:
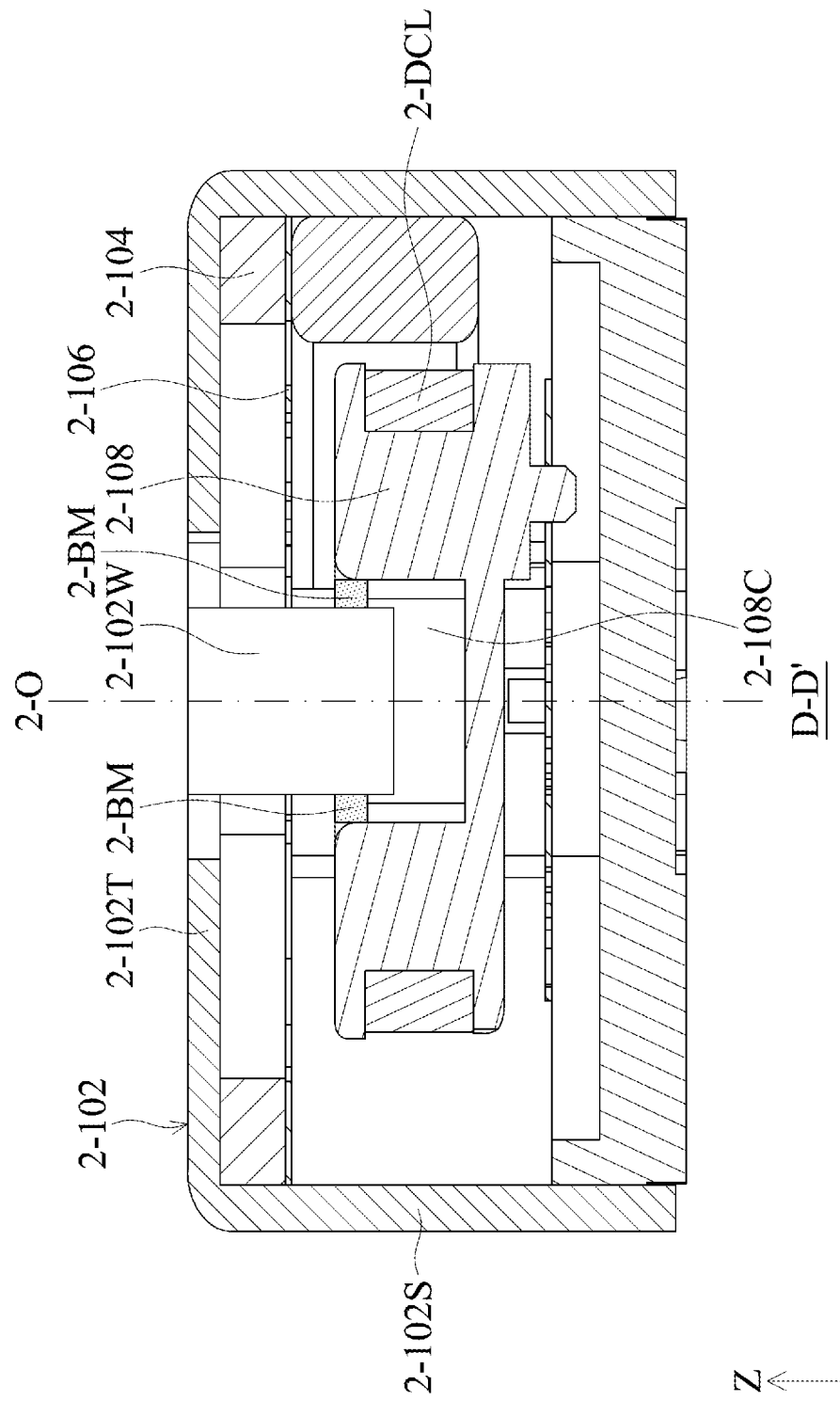

Please refer to FIG. 2-4 and FIG. 2-5, FIG. 2-4 is a schematic diagram showing a partial structure of the optical element driving mechanism 2-100 according to an embodiment of the present disclosure, and FIG. 2-5 is a cross-sectional view along line B-B' in FIG. 2-1 according to an embodiment of the present disclosure. In this embodiment, as shown in FIG. 2-4, an accommodating space 2-ADS is formed between the base 2-112, the frame 2-104, and the casing 2-102 (illustrated by a broken line), and the optical element driving mechanism 2-100 may further include an adhering member 2-AD disposed in the accommodating space 2-ADS. The adhering member 2-AD is configured to be directly adhered to the base 2-112, the frame 2-104, the casing 2-102, and the first magnet 2-M11 or the second magnet 2-M12 of the drive assembly. In addition, the first elastic member 2-106 is disposed on the frame 2-104, and the second elastic member 2-2-110 is disposed on the base 2-112 (FIG. 2-5), and the adhering member 2-AD may be also directly adhered to the first elastic member 2-106 and the second elastic member 2-110.

Specifically, as shown in FIG. 2-5, the adhering member 2-AD may be directly connected to the side walls 2-102S, the base 2-112, and the frame protrusion 2-104P. A single adhering member 2-AD (such as glue) can be used to bond multiple members in the present disclosure, thereby achieving the purpose of miniaturization, improving overall mechanical strength and simplifying the manufacturing process at the same time. Furthermore, the position of the adhering member 2-AD can be controlled by the accommodating space 2-ADS formed by the side walls 2-102S, the frame protrusion 2-104P, and the surface of the magnetic element (such as the second magnet 2-M12) so as to ensure the accuracy of positioning the adhering member 2-AD.

Please continue to refer to FIG. 2-5. In this embodiment, the base 2-112 further includes a projection 2-1122 extending toward the top wall 2-102T of the casing 2-102, and the adhering member 2-AD adheres directly to the projection 2-1122. When viewed in a direction perpendicular to the optical axis 2-O, the projection 2-1122 partially overlaps the frame protrusion 2-104P, and the projection 2-1122 is farther away from the optical axis 2-O than the frame protrusion 2-104P. Based on the design of the projection 2-1122, the position of the frame protrusion 2-104P can be limited, thereby improving assembly accuracy. That is, the projection 2-1122 can serve as a positioning structure of the base 2-112, and the projection 2-122 is disposed between the casing 2-102 and the frame 2-104 to improve positioning accuracy.

Specifically, as shown in FIG. 2-5, the projection 2-1122 may have a first projection surface 2-PS1 and a second projection surface 2-PS2. The first projection surface 2-PS1 faces the frame protrusion 2-104P, the second projection surface 2-PS2 faces the side wall 2-102S, and the adhering member 2-AD adheres directly to the first projection surface 2-PS1 and the second projection surface 2-PS2. Therefore, the adhering member 2-AD can cover a plurality of surfaces of the projection 2-1122 so as to increase the bonding area and improve the overall mechanical strength.

Please refer to FIG. 2-6, which is a partial structural diagram of the frame 2-104 and the first magnet 2-M11 according to an embodiment of the present disclosure. As shown in FIG. 2-6, the frame protrusion 2-104P of the frame 2-104 has a first protrusion surface 2-FS1 and a second protrusion surface 2-FS2, the first protrusion surface 2-FS1 and the second protrusion surface 2-FS2 all face the magnetic element (for example, the first magnet 2-M11) of the driving assembly, and the first protrusion surface 2-FS1 and the second protrusion surface 2-FS2 are both parallel to the optical axis 2-O (the Z-axis). Based on this structural design, the first protrusion surface 2-FS1 and the second protrusion surface 2-FS2 of the frame protrusion 2-104P can serve as positioning features to fix the magnetic element and improve positioning accuracy.

Please refer to FIG. 2-7, which is a partial structural diagram of the base 2-112 according to some embodiments of the present disclosure. As shown in FIG. 2-7, the projection 2-1122 has a groove 2-112T corresponding to the casing 2-102. The groove 2-112T can be used to define a disposing range of the adhering member 2-AD, so that the adhering member 2-AD can easily contact the groove 2-112T and the casing 2-102 so as to improve the accuracy of disposing the adhering member 2-AD, thereby improving the assembly convenience, and also increasing the bonding area and overall strength.

In addition, the base 2-112 has a rectangular structure (FIG. 2-2). When the adhering member 2-AD is disposed at the corner of the base 2-112, the adhering member 2-AD also flows to one side of the base 2-112 (as shown in FIG. 2-1) and is configured to adhere to the sidewall 2-102S and the base 2-112, so that the overall sealing and strength can be improved.

Please refer to FIG. 2-7 and FIG. 2-8 together. FIG. 2-8 is a cross-sectional view of the optical element driving mechanism 2-100 according to another embodiment of the present disclosure. As shown in FIG. 2-8, the projection 2-1122 further has a third projection surface 2-PS3 facing the top wall 2-102T. It should be noted that an avoidance structure 2-RS (for example, a radius or a chamfer) is formed at the boundary between the third projection surface 2-PS3 and the first projection surface 2-PS1, and the avoidance structure 2-RS is farther away from the frame protrusion 2-104P than the first projection surface 2-PSI. Based on the design of the avoidance structure 2-RS, when the optical element driving mechanism 2-100 is assembled, positioning can be easily performed, and the risk of debris generated by collision between members can also be reduced at the same time.

Please refer to FIG. 2-9, which is a partial structural diagram of the frame 2-104, the base 2-112, and the second elastic member 2-110 according to an embodiment of the present disclosure. As shown in FIG. 2-9, the base 2-112 further has a base positioning structure 2-1123 extending toward the top wall 2-102T, and the base positioning structure 2-1123 passes through the second elastic member 2-110. Thus, when viewed along a direction perpendicular to the optical axis 2-O (such as along the X-axis or the Y-axis), the base positioning structure 2-1123 partially overlaps the second elastic member 2-110. Based on the design of the base positioning structure 2-1123, the accuracy of positioning the second elastic member 2-110 can be increased.

In addition, a recess 2-104C corresponding to the base positioning structure 2-1123 can be formed on the frame protrusion 2-104P so that the recess 2-104C is configured to receive the base positioning structure 2-1123. Therefore, when viewed in the direction of the optical axis 2-O (the Z-axis), the base positioning structure 2-1123 overlaps the frame protrusion 2-104P. In other embodiments, the base positioning structure 2-1123 may partially overlap the frame protrusion 2-104P when viewed in the direction of the optical axis 2-O (the Z-axis). Therefore, the purpose of miniaturization of the optical element driving mechanism 2-100 can be further achieved.

Next, please refer to FIG. 2-10, which is a partial structural diagram of an optical element driving mechanism 2-100' according to another embodiment of the present disclosure. In this embodiment, the circuit assembly 2-114 includes a body 2-1141 and a plurality of metal lines 2-1143. A portion of the metal lines 2-1143 is disposed within the body 2-1141 and another portion is exposed outside the body 2-1141. The optical element driving mechanism 2-100' may further include a position sensing component 2-116 and a filter 2-118 disposed on the body 2-1141. The position sensing component 2-116 is configured to sense the motion of the holder 2-108 relative to the base 2-112, and the filter 2-118 is configured to filter the electrical signals entering the position sensing component 2-116.

As shown in FIG. 2-10, the adhering member 2-AD adheres directly to the circuit assembly 2-114, the base 2-112, and the frame 2-104. The purpose of miniaturization can be achieved, the overall mechanical strength can be improved, and the manufacturing process can be simplified at the same time by adhering the circuit assembly 2-114 with other components at the same time. Furthermore, the adhering member 2-AD also adheres directly to the metal lines 2-1143 to avoid a short circuit of the metal lines 2-1143. That is, the adhering member 2-AD of the present disclosure can also serve as an insulating material.

In addition, as shown in FIG. 2-10, at a processing position 2-PP, the exposed metal line 2-1143 may be connected to the second elastic member 2-110 by soldering so that the circuit assembly 2-114 is electrically connected to the second elastic member 2-110. As a result, the second elastic member 2-110 is electrically connected to an external circuit (for example, a circuit board) through the circuit assembly 2-114.

Please refer to FIG. 2-11, which is a cross-sectional view along line C-C' in FIG. 2-1 according to an embodiment of the present disclosure. As shown in FIG. 2-11, the circuit assembly 2-114 has a surface 2-1145, and the surface 2-1145 is closer to the holder 2-108 than the position sensing component 2-116. That is, the body 2-1141 of the circuit assembly 2-114 can protect the position sensing component 2-116 from colliding with other components and being damaged).

Referring to FIG. 2-12 and FIG. 2-13. FIG. 2-12 is a schematic diagram of a frame 2-104A and a first elastic member 2-106 of an optical element driving mechanism 2-100A according to another embodiment of the present disclosure, and FIG. 2-13 is a schematic diagram of the frame 2-104A, a first elastic member 2-106, and the holder 2-108 according to another embodiment of the present disclosure. As shown in FIG. 2-13, the optical element driving mechanism 2-100A may further include a shock absorbing member 2-BM disposed on the frame protrusion 2-104P and the holder 2-108 (or the shock absorbing member 2-BM may be directly in contact with the driving coil 2-DCL).

Specifically, the frame protrusion 2-104P has an accommodating structure 2-104R corresponding to the holder 2-108, and the accommodating structure 2-104R is configured to accommodate one end of the shock absorbing member 2-BM, so that the shock absorbing member 2-BM can be easily positioned. Because the shock absorbing member 2-BM is disposed between the fixed assembly and the movable assembly, so that unnecessary vibration can be suppressed, and the movable assembly can quickly reach a stable state after operation.

In addition, please refer to FIG. 2-12 and FIG. 2-14 at the same time. FIG. 2-14 is a cross-sectional view of the optical element driving mechanism 2-100A according to another embodiment of the present disclosure. In this embodiment, a positioning structure 2-104S can be formed on a bottom surface 2-1041 of the frame protrusion 2-104P the positioning structure 2-104S extends in the direction of the optical axis 2-O, and the second elastic member 2-110 is disposed on the bottom surface 2-1041. When viewed in a direction perpendicular to the optical axis 2-O, as shown in FIG. 2-14, the positioning structure 2-104S partially overlaps the second elastic member 2-110. Based on the design of the positioning structure 2-104S the assembly accuracy of the second elastic member 2-110 can be improved.

Further, as shown in FIG. 2-14, the base 2-112 has an avoidance groove 2-1125 corresponding to the positioning structure 2-104S, and when viewed in a direction perpendicular to the optical axis 2-O, the avoidance groove 2-1125 partially overlaps the positioning structure 2-104S. Based on this structural design, the base 2-112 can be prevented from colliding with the frame protrusion 2-104P, and the purpose of miniaturization can be achieved.

Further, the adhering member 2-AD is farther away from the optical axis 2-O than the frame protrusion 2-104P. As shown in FIG. 2-14, the frame protrusion 2-104P can serve as a blocking wall to prevent the adhering member 2-AD from entering the inside of the frame 2-104A to contact the holder 2-108, causing malfunction of the optical element driving mechanism 2-100A.

Please refer to FIG. 2-15, which is a partial cross-sectional view of an optical element driving mechanism 2-100B according to another embodiment of the present disclosure. In this embodiment, the base 2-112 further has a positioning structure 2-1126. A shock absorbing member 2-BM is disposed between the positioning structure 2-1126 and the holder 2-108. The shock absorbing member 2-BM can be directly in contact with the driving coil 2-DCL or the holder 2-108. Based on the design of the shock absorbing member 2-BM, unnecessary vibration can be suppressed, and the holder 2-108 can quickly reach a stable state after operation.

Furthermore, as shown in FIG. 2-15, the frame protrusion 2-104P is closer to the side wall 2-102S than the positioning structure 2-1126, so as to prevent the shock absorbing member 2-BM from being in contact with the side wall 2-102S. Furthermore, a groove 2-104C may also be formed on the frame protrusion 2-104P, and the positioning structure 2-1126 may be disposed within the groove 2-104C. When viewed in the direction of the optical axis 2-O the frame protrusion 2-104P overlaps the positioning structure 2-1126. In other embodiments, the frame protrusions 2-104P may also partially overlap the positioning structure 2-1126.

Please refer to FIG. 2-16, which is a cross-sectional view of the optical element driving mechanism 2-100 along line D-D' in FIG. 2-1 according to an embodiment of the present disclosure. In this embodiment, the top wall 2-102T further has an anti-twist structure 2-102W extending along the optical axis 2-O, and a twist-proof recess 2-108C corresponding to the anti-twist structure 2-102W is formed on the holder 2-108. In addition, the optical element driving mechanism 2-100 further includes a shock absorbing member 2-BM disposed on the anti-twist structure 2-102W and the twist-proof recess 2-108C of the holder 2-108. In some embodiments, the shock absorbing member 2-BM is a resilient gel, so that the shock absorbing member 2-BM is disposed between the anti-twist structure 2-102W and the holder 2-108 to suppress unnecessary vibration, and therefore the holder 2-108 can quickly reach a stable state after operation.

Although some embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, compositions of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. Moreover, the scope of the appended claims should be accorded the broadest interpretation so as to encompass all such modifications and similar arrangements.

While the invention has been described by way of example and in terms of preferred embodiment, it should be understood that the invention is not limited thereto. On the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. An optical element driving mechanism, comprising:
 a holder, configured to be connected to an optical element;
 a casing, having a top wall and a side wall, wherein the top wall having a plate-shaped structure is not parallel to the side wall having a plate-shaped structure;
 a driving assembly, configured to drive the holder to move relative to the casing; and
 wherein the top wall has an anti-twist structure extending toward the holder, a twist-proof recess corresponding to the anti-twist structure is formed on the holder, and the optical element driving mechanism further includes a first shock absorbing member directly contacting the anti-twist structure and the twist-proof recess.

2. The optical element driving mechanism as claimed in claim 1, wherein the optical element driving mechanism further includes:
 a base, wherein the holder is movably connected to the base;
 a frame, disposed on the top wall and having a frame protrusion extending toward the base, wherein an accommodating space is formed between the base, the frame and the casing; and
 an adhering member, disposed in the accommodating space and configured to directly adhere to the base, the frame, the casing, and the driving assembly;
 wherein the adhering member adheres directly to the side wall and the frame protrusion.

3. The optical element driving mechanism as claimed in claim 2, wherein the adhering member is farther away from an optical axis of the optical element than the frame protrusion.

4. The optical element driving mechanism as claimed in claim 2, wherein the frame protrusion has a first protrusion surface and a second protrusion surface, both the first protrusion surface and the second protrusion surface face the driving assembly, and both the first protrusion surface and the second protrusion surface are parallel to an optical axis of the optical element.

5. The optical element driving mechanism as claimed in claim 2, wherein the base further includes a projection extending toward the top wall of the casing, and the adhering member adheres directly to the projection, wherein when viewed in a direction perpendicular to an optical axis of the optical element, the projection partially overlaps the frame protrusion.

6. The optical element driving mechanism as claimed in claim 5, wherein the projection is farther away from the optical axis than the frame protrusion.

7. The optical element driving mechanism as claimed in claim 6, wherein the projection includes:
 a first projection surface, facing the frame protrusion; and
 a second projection surface, facing the side wall, wherein the adhering member adheres directly to the first projection surface and the second projection surface.

8. The optical element driving mechanism as claimed in claim 7, wherein the projection has a groove corresponding to the casing.

9. The optical element driving mechanism as claimed in claim 7, wherein the projection further has a third projection surface facing the top wall, an avoidance structure is formed at a boundary between the third projection surface and the first projection surface, and the avoidance structure is farther away from the frame protrusion than the first projection surface.

10. The optical element driving mechanism as claimed in claim 2, wherein the base has a rectangular structure, the adhering member is disposed at a corner of the base, and the adhering member is further disposed on a side of the base and is configured to adhere to the sidewall and the base.

11. The optical element driving mechanism as claimed in claim 2, wherein the optical element driving mechanism further comprises:
 a circuit assembly, disposed on the frame, wherein the adhering member adheres directly to the circuit assembly; and
 a position sensing component, disposed on the circuit assembly and configured to sense motion of the holder relative to the base;

wherein the circuit assembly has a surface, and the surface is closer to the holder than the position sensing component.

12. The optical element driving mechanism as claimed in claim 11, wherein the circuit assembly includes a body and a metal line, a portion of the metal line is exposed outside the body, and the adhering member adheres directly to the metal line.

13. The optical element driving mechanism as claimed in claim 2, wherein the base further has a base positioning structure extending toward the top wall, and when viewed in a direction perpendicular to an optical axis of the optical element, the base positioning structure partially overlaps a second elastic member.

14. The optical element driving mechanism as claimed in claim 13, wherein when viewed in a direction of the optical axis, the base positioning structure partially overlaps the frame protrusion.

15. The optical element driving mechanism as claimed in claim 13, wherein a recess is formed on the frame protrusion and is configured to receive the base positioning structure.

16. The optical element driving mechanism as claimed in claim 15, wherein the frame protrusion is not in contact with the base positioning structure and the base.

17. The optical element driving mechanism as claimed in claim 2, wherein the frame protrusion has an accommodating structure corresponding to the holder, and the optical element driving mechanism further comprises a second shock absorbing member disposed between the accommodating structure and the holder.

18. The optical element driving mechanism as claimed in claim 17, wherein the frame protrusion has a positioning structure extending in a direction of an optical axis of the optical element, and when viewed in a direction perpendicular to the optical axis, the positioning structure partially overlaps a second elastic member.

19. The optical element driving mechanism as claimed in claim 18, wherein the base has an avoidance groove corresponding to the positioning structure, and when viewed in a direction perpendicular to the optical axis, the avoidance groove partially overlaps the positioning structure.

20. The optical element driving mechanism as claimed in claim 17, wherein the second shock absorbing member is directly in contact with the driving assembly.

* * * * *